(12) United States Patent
Barrett et al.

(10) Patent No.: US 10,281,937 B2
(45) Date of Patent: May 7, 2019

(54) AUTOMATICALLY BALANCING REGISTERED FOR HVAC SYSTEM

(71) Applicant: Zoner LLC, Boulder, CO (US)

(72) Inventors: Jon Barrett, Boulder, CO (US); Ronald Lingemann, Boulder, CO (US)

(73) Assignee: Zoner LLC, Boulder, CO (US)

( * ) Notice: Subject to any disclaimer, the term of this patent is extended or adjusted under 35 U.S.C. 154(b) by 407 days.

(21) Appl. No.: 15/155,330

(22) Filed: May 16, 2016

(65) Prior Publication Data

US 2016/0259351 A1    Sep. 8, 2016

Related U.S. Application Data

(63) Continuation of application No. 13/940,432, filed on Jul. 12, 2013, which is a continuation of application
(Continued)

(51) Int. Cl.
*F24F 11/053*    (2006.01)
*G05D 23/19*    (2006.01)
(Continued)

(52) U.S. Cl.
CPC ......... *G05D 23/1934* (2013.01); *F24F 3/044* (2013.01); *F24F 11/30* (2018.01);
(Continued)

(58) Field of Classification Search
CPC .. F24F 11/46; F24F 11/56; F24F 11/63; F24F 11/72; F24F 11/74; F24F 11/755; G05D 23/1932; G05D 23/1934
See application file for complete search history.

(56) References Cited

U.S. PATENT DOCUMENTS 2,722,881 A    11/1955  Sutterfield et al.
3,724,534 A     4/1973  Weatherston ................... 165/12
(Continued)

FOREIGN PATENT DOCUMENTS

WO    WO 2010/078459    7/2010    ............. F24F 11/00

OTHER PUBLICATIONS

Advantech, Co., Ltd., "Building Automation Systems; Product News," 3 pages, Jun. 11, 2008.
(Continued)

*Primary Examiner* — Jonathan Bradford
(74) *Attorney, Agent, or Firm* — Sunstein Kann Murphy & Timbers LLP

(57) ABSTRACT

Distributed nodes, such as intelligent register controllers, of a heating, ventilating and/or air conditioning (HVAC) system wirelessly communicate with each other on a peer-to-peer basis, forming a network, and collectively control the HVAC system, without a central controller. The intelligent register controllers collectively control the amount of conditioned air introduced into each region. Each node may base its operation at least in part on information about one or more (ideally all) of the other nodes. Each intelligent register controller automatically determines how much conditioned air to allow into its region, or how much return air to allow to be withdrawn from its region. Each register controller automatically determines when and to what extent to operate its respective controllable damper.

20 Claims, 24 Drawing Sheets

Related U.S. Application Data

No. 12/650,320, filed on Dec. 30, 2009, now Pat. No. 8,550,370.

(60) Provisional application No. 61/203,911, filed on Dec. 30, 2008.

(51) Int. Cl.

| | |
|---|---|
| *F24F 13/08* | (2006.01) |
| *F24F 3/044* | (2006.01) |
| *F24H 9/20* | (2006.01) |
| *F24F 11/30* | (2018.01) |
| *F24F 11/62* | (2018.01) |
| *F24F 11/76* | (2018.01) |
| *F24F 11/755* | (2018.01) |
| *F24F 11/56* | (2018.01) |

(52) U.S. Cl.
CPC .............. *F24F 11/62* (2018.01); *F24F 11/76* (2018.01); *F24F 13/082* (2013.01); *F24H 9/2064* (2013.01); *G05D 23/1932* (2013.01); *F24F 11/56* (2018.01); *F24F 11/755* (2018.01)

(56) References Cited

U.S. PATENT DOCUMENTS

| | | | |
|---|---|---|---|
| 3,777,568 A | 12/1973 | Risgin et al. ............ 73/355 EM |
| 3,809,314 A | 5/1974 | Engelke et al. ................. 236/49 |
| 4,040,564 A | 8/1977 | Waeldner et al. .............. 236/49 |
| 4,229,945 A | 10/1980 | Griffin et al. .................... 62/229 |
| 4,417,687 A | 11/1983 | Grant ........................... 236/9 A |
| 4,634,294 A | 1/1987 | Christol et al. ................ 374/170 |
| 4,716,957 A | 1/1988 | Thompson et al. ............. 165/12 |
| 4,754,697 A | 7/1988 | Asselbergs ...................... 98/103 |
| 4,797,840 A | 1/1989 | Fraden ........................... 364/557 |
| 4,809,593 A | 3/1989 | Asselbergs ...................... 98/103 |
| 4,824,012 A | 4/1989 | Tate ............................ 236/49.5 |
| 4,830,095 A * | 5/1989 | Friend .................... F24F 3/044 165/208 |
| 4,846,399 A | 7/1989 | Asselbergs ................... 236/49.4 |
| 4,886,110 A | 12/1989 | Jackson .......................... 165/22 |
| 4,942,348 A | 7/1990 | Nilssen .......................... 318/468 |
| 4,969,508 A | 11/1990 | Tate et al. ....................... 165/22 |
| 5,251,815 A | 10/1993 | Foye ............................ 236/49.3 |
| 5,301,101 A | 4/1994 | MacArthur et al. .......... 364/156 |
| 5,318,104 A * | 6/1994 | Shah .................. G05D 23/1934 165/208 |
| 5,364,304 A | 11/1994 | Hampton ...................... 454/258 |
| 5,449,319 A | 9/1995 | Dushane et al. .............. 454/319 |
| 5,489,238 A | 2/1996 | Asselbergs ................... 454/329 |
| 5,495,887 A | 3/1996 | Kathnelson et al. ........ 165/11.1 |
| 5,533,668 A | 7/1996 | Erikson ....................... 236/49.3 |
| 5,535,814 A * | 7/1996 | Hartman ................. F24F 11/30 165/217 |
| 5,622,221 A | 4/1997 | Genga, Jr. et al. ........... 165/208 |
| 5,711,480 A | 1/1998 | Zepke et al. .................... 236/51 |
| 5,782,296 A | 7/1998 | Mehta .......................... 165/268 |
| 5,810,245 A | 9/1998 | Heitman et al. ............. 236/49.3 |
| 5,833,134 A | 11/1998 | Ho et al. ...................... 236/49.3 |
| 5,944,098 A | 8/1999 | Jackson ........................ 165/217 |
| 6,145,752 A | 11/2000 | Jackson ...................... 236/78 R |
| 6,152,375 A | 11/2000 | Robison .......................... 236/51 |
| 6,250,382 B1 | 6/2001 | Rayburn et al. ............. 165/248 |
| 6,322,443 B1 | 11/2001 | Jackson ........................ 454/329 |
| 6,488,081 B2 | 12/2002 | Rayburn et al. ............. 165/250 |
| 6,491,094 B2 | 12/2002 | Rayburn et al. ............. 165/250 |
| 6,574,234 B1 | 6/2003 | Myer et al. ................... 370/462 |
| 6,692,349 B1 | 2/2004 | Brinkerhoff et al. ......... 454/256 |
| 6,725,281 B1 | 4/2004 | Zintel et al. .................. 709/318 |
| 6,837,786 B2 | 1/2005 | Linde et al. .................. 454/256 |
| 6,861,785 B2 | 3/2005 | Andre et al. .................. 310/339 |
| 7,014,124 B2 | 3/2006 | Gottlieb ....................... 236/49.3 |
| 7,130,720 B2 | 10/2006 | Fisher ........................... 700/277 |
| 7,156,316 B2 | 1/2007 | Kates ........................... 236/1 B |
| 7,163,156 B2 | 1/2007 | Kates ........................... 236/1 B |
| 7,168,627 B2 | 1/2007 | Kates ........................... 236/1 B |
| 7,188,779 B2 | 3/2007 | Alles ............................ 236/1 B |
| 7,448,435 B2 | 11/2008 | Garozzo ...................... 165/11.1 |
| 7,590,469 B2 | 9/2009 | Grohman ...................... 700/276 |
| 8,550,370 B2 | 10/2013 | Barrett et al. ............. 236/91 R |
| 2004/0194484 A1 | 10/2004 | Zou et al. ....................... 62/186 |
| 2005/0055427 A1 | 3/2005 | Frutiger et al. ............... 709/220 |
| 2005/0127196 A1 | 6/2005 | Gottlieb .......................... 236/51 |
| 2005/0156050 A1* | 7/2005 | Shah ..................... F24F 3/0442 236/1 B |
| 2006/0071087 A1 | 4/2006 | Kates ........................... 236/1 B |
| 2006/0071089 A1* | 4/2006 | Kates ................. G05D 23/1934 236/94 |
| 2008/0179052 A1 | 7/2008 | Kates ........................... 165/208 |
| 2008/0277486 A1 | 11/2008 | Seem et al. .................. 236/49.3 |
| 2010/0163633 A1 | 7/2010 | Barrett et al. .............. 236/49.3 |
| 2014/0000861 A1 | 1/2014 | Barrett et al. ............... 165/208 |

OTHER PUBLICATIONS

Brath, "Towards autonomous control of HVAC systems," Ph.D. Thesis, Aalborg University, 212 pages, Nov. 1999.
Brown, "Multizone register controlled residential heating: Optimized for energy use and comfort," Masters Thesis, University of California, Berkeley, 60 pages, 2007.
Coffin, Direct digital control for building HVAC systems, Second Edition, Springer, ISBN 0-412-14531-6, p. 69, Dec. 1998.
Diehl, et al., "Wireless RF Distribution in Buildings using Heating and Ventilation Ducts," Carnegie Mellon University, 1 page, 1999.
Platt, et al., "The Tiny Agent—Wireless Sensor Networks Controlling Energy Resources," Journal of Networks, vol. 3, No. 4, pp. 42-50, Apr. 2008.
Redfern, et al., "Design architecture for multi-zone HVAC control systems from existing single-zone systems using wireless sensor networks," Proc. of SPIE vol. 6414, 8 pages, 2007.
Underwood, HVAC Control Systems: Modelling, Analysis and Design, Routledge, ISBN 0 419 20980 8, p. 21, 1999.
Wall, "EE404/EE504 Distributed Processing Class Project #1," University of Idaho, pp. 1-5, Spring 2002.
Watts, et al., "Application of multizone HVAC control using wireless sensor networks and actuating vent registers," University of California, Berkeley, 9 pages, Sep. 2007.
Wikipedia, "BACnet," http://en.wikipedia.org/wiki/BACnet, 3 pages, Dec. 14, 2007.
Wikipedia, "Building automation," http://en.wikipedia.org/wiki/Building_automation, 6 pages, Dec. 18, 2007.
Wikipedia, "Damper (flow)," http://en.wikipedia.org/wiki/Damper_(flow), 4 pages, Dec. 15, 2007.
Wikipedia, "Direct digital control," https://en.wikipedia.org/wiki/Direct_digital_control, 2 pages, Nov. 10, 2007.
Wikipedia, "LonWorks," http://en.wikipedia.org/wiki/LonWorks, 3 pages, Dec. 21, 2007.
ISA/European Patent Office, International Search Report and Written Opinion of the International Searching Authority for International Application No. PCT/US2009/069865, 15 pages, dated Apr. 21, 2010.

* cited by examiner

| Messages Byte(s) | Description |
|---|---|
| 0x00 - 0x03 | Preamble (0xAA) |
| 0x04 - 0x07 | Sync (0xD3, 0x91, 0xD3, 0x91) |
| 0x08 | Length of all elements to follow except CRC (35) |
| 0x09 | Address (0x00 for broadcast) |
| 0x0A | Packet type<br>0 = Device standard data<br>24 = Device standard data sent in response to remote standard data query command (17) |
| 0x0B | Status Byte<br>Bit 0 = Remote ops in progress<br>Bit 1 = Software update follows<br>Bit 2 = Demo mode |
| 0x0C | Device ID 0 |
| 0x0D | Device ID 1 |
| 0x0E | Device ID 2 |
| 0x0F | Device ID 3 |
| 0x10 | Chain number (0 is first) |
| 0x11 | Chain length |
| 0x12-0x13 | Reserved |
| 0x14 | Current measured temperature |
| 0x15 | Temperature target |
| 0x16 | Vent position (registers) |
| 0x17 | Program selection |
| 0x18 | Power available (short term) |
| 0x19 | Power stability (long term) |
| 0x1A | |
| 0x1B | |
| 0x1C | |
| 0x1D | |
| 0x1E | |
| 0x1F | |
| 0x20 | |
| 0x21 | |
| 0x22 | |
| 0x23 | |
| 0x24 | |
| 0x25 | Cyclic data selection |
| 0x26 - 0x2D | Cyclic data and requests |
| 0x2E - 0x2F | 16-bit CRC |

*FIG. 21*

| Messages Byte(s) | Description |
| --- | --- |
| 0x00 - 0x03 | Preamble (0xAA) |
| 0x04 - 0x07 | Sync (0xD3, 0x91, 0xD3, 0x91) |
| 0x08 | Length of all elements to follow except CRC (35) |
| 0x09 | Address (0x00 for broadcast) |
| 0x0A | Packet type<br>1 = Device settings data<br>25 = Device settings data sent in response to remote standard data query command (17) |
| 0x0B | Status Byte<br>Bit 0 = Remote ops in progress<br>Bit 1 = Software update follows<br>Bit 2 = Demo mode |
| 0x0C | Device ID 3 (MSBs) |
| 0x0D | Device ID 2 |
| 0x0E | Device ID 1 |
| 0x0F | Device ID 0 (LSBs) |
| 0x10 | Chain number (0 is first) |
| 0x11 | Chain length |
| 0x12 - 0x13 | reserved |
| 0x14 - 0x17 | Serial number (32-bit) |
| 0x18 - 0x26 | Name (14-char) |
| 0c27 - 0x2D | Reserved |
| 0x2E - 0X2F | 16-bit CRC |

*FIG. 22*

| Messages Byte(s) | Description |
| --- | --- |
| 0x00 - 0x03 | Preamble (0xAA) |
| 0x04 - 0x07 | Sync (0xD3, 0x91, 0xD3, 0x91) |
| 0x08 | Length of all elements to follow except CRC (15) |
| 0x09 | Address (0x00 for broadcast) |
| 0x0A | Packet type<br>16 = all devices send ID via IR<br>17 = target device send standard packet immediately<br>18 = target device send set-up data immediately |
| 0x0B | Status Byte<br>Bit 0 = Remote ops in progress<br>Bit 1 = Software update follows<br>Bit 2 = Demo mode |
| 0x0C | Remote ID 3 (MSBs) |
| 0x0D | Remote ID 2 |
| 0x0E | Remote ID 1 |
| 0x0F | Remote ID 0 (LSBs) |
| 0x10 | Target device ID 3 (MSBs) (1) |
| 0x11 | Target device ID 2 (1) |
| 0x12 | Target device ID 1 (1) |
| 0x13 | Target device ID 0 (LSBs) (1) |
| 0x14 | reserved |
| 0x15 | reserved |
| 0x16 | reserved |
| 0x17 | reserved |
| 0x18 - 0x19 | 16-bit CRC |

*FIG. 23*

| Messages Byte(s) | Description |
| --- | --- |
| 0x00 - 0x03 | Preamble (0xAA) |
| 0x04 - 0x07 | Sync (0xD3, 0x91, 0xD3, 0x91) |
| 0x08 | Length of all elements to follow except CRC (35) |
| 0x09 | Address (0x00 for broadcast) |
| 0x0A | Packet type<br>20 = update target device standard data |
| 0x0B | Status Byte<br>Bit 0 = Remote ops in progress<br>Bit 1 = Software update follows<br>Bit 2 = Demo mode |
| 0x0C | Remote ID 3 (MSBs) |
| 0x0D | Remote ID 2 |
| 0x0E | Remote ID 1 |
| 0x0F | Remote ID 0 (LSBs) |
| 0x10 | Target device ID 3 (MSBs) |
| 0x11 | Target device ID 2 |
| 0x12 | Target device ID 1 |
| 0x13 | Target device ID 0 (LSBs) |
| 0x14 - 0x2D | Data in same order and format as in standard device data packet |
| 0x2E - 0x2F | 16-bit CRC |

*FIG. 24*

| Messages Byte(s) | Description |
| --- | --- |
| 0x00 - 0x03 | Preamble (0xAA) |
| 0x04 - 0x07 | Sync (0xD3, 0x91, 0xD3, 0x91) |
| 0x08 | Length of all elements to follow except CRC (35) |
| 0x09 | Address (0x00 for broadcast) |
| 0x0A | Packet type<br>21 = update target device settings |
| 0x0B | Status Byte<br>Bit 0 = Remote ops in progress<br>Bit 1 = Software update follows<br>Bit 2 = Demo mode |
| 0x0C | Remote ID 3 (MSBs) |
| 0x0D | Remote ID 2 |
| 0x0E | Remote ID 1 |
| 0x0F | Remote ID 0 (LSBs) |
| 0x10 | Target device ID 3 (MSBs) (1) |
| 0x11 | Target device ID 2 (1) |
| 0x12 | Target device ID 1 (1) |
| 0x13 | Target device ID 0 (LSBs) (1) |
| 0x14 - 0x2D | Data in same order and format as in standard device settings packet |
| 0x2E - 0x2F | 16-bit CRC |

*FIG. 25*

| Bytes | DATA | Updated interval | |
|---|---|---|---|
| 0 | Status | | |
| 1 | Chain number | | |
| 2-5 | Product ID | | |
| 6-19 | Device name | | |
| 20 | Current measured temperature | | |
| 21 | Target temperature | | |
| 22 | Vent position (registers) | | |
| 23 | Program selection | | |
| 24 | Power available (short term) | | |
| 25 | Power stability (long term) | | |
| 26 | Time | | |
| 27 | Repeater functions | | |
| 28 | reserved | | |
| 29 | reserved | | |
| 30 | Reception quality 0-3 | | |
| 31 | Reception quality 4-7 | | |
| 32 | Reception quality 8-11 | | |
| 33 | Reception quality 12-15 | | |
| 34 | Reception quality 16-19 | | |
| 35 | Reception quality 20-23 | | |
| 36 | Reception quality 24-27 | | |
| 37 | Reception quality 28-31 | | |
| 38 | Reception quality 32-35 | | |
| 39 | Reception quality 36-39 | | |
| 40 | Reception quality 40-43 | | |
| 41 | Reception quality 44-47 | | |
| 42 | Reception quality 48-51 | | |
| 43 | Reception quality 52-55 | | |
| 44 | Reception quality 56-59 | | |
| 45 | reserved | | |
| 46 | reserved | | |
| 47 | reserved | | |

*FIG. 26*

AUTOMATICALLY BALANCING REGISTERED FOR HVAC SYSTEM

CROSS REFERENCE TO RELATED APPLICATIONS

This application is a continuation of U.S. patent application Ser. No. 13/940,432, filed Jul. 12, 2013 by Jon Barrett and Ronald Lingemann, titled "Automatically Balancing Register for HVAC Systems," which is a continuation of U.S. patent application Ser. No. 12/650,320, filed Dec. 30, 2009 by Jon Barrett and Ronald Lingemenn, titled "Automatically Balancing Register for HVAC System, which claims the benefit of U.S. Provisional Patent Application No. 61/203,911, filed Dec. 30, 2008 by Jon Barrett and Ronald Lingemann, titled "Automatically Balancing Register for HVAC Systems," the entire contents of all of which are hereby incorporated by reference herein, for all purposes.

TECHNICAL FIELD

The present invention relates to control systems for heating, ventilating and air conditioning (HVAC) system and, more particularly, to systems that distribute control of an HVAC system among a plurality of components, such as air supply registers, remote control units and thermostats, which communicate with each other.

BACKGROUND ART

Conventional forced air heating, ventilating and/or air conditioning (HVAC) systems have manually adjustable air register vents (air volume control dampers) to control the amount of conditioned air introduced into a room or other portion (for simplicity, collectively hereinafter referred to as a "region") of a building. In theory, the vents may be manually adjusted upon installing the HVAC system or thereafter, so as to provide a correct amount of heated, cooled, filtered, etc. (collectively referred to herein as "conditioned") air to each region. However, in practice, this seldom works properly. Usually, the registers are not adjusted at all, unless a region is intolerably cold or hot. In addition, it may be impossible to get enough conditioned air to a region without adjusting the registers in every other region. Thus, manually adjusted registers rarely achieve a uniform comfort level throughout a building.

Manually adjusted registers can also waste energy. For example, introducing more conditioned air into a region than is necessary to achieve a comfortable temperature causes a heating or cooling plant to operate longer or at a higher level than would otherwise be necessary. Even if registers have been adjusted to achieve a desired temperature in all regions, the registers may all be closed more than necessary, thus constricting the air flow and increasing pressure in the ducts. This causes the blower that moves the air to do more work than necessary, thereby wasting energy. In addition, the high air pressure in the ducts exacerbates any leaks in the ducts. Such duct leaks frequently allow conditioned air to enter an attic, crawl space or other region that does not need heating or cooling, thereby wasting energy.

Most homes with forced air HVAC systems have only one thermostat. Not only does this mean that only one region actually maintains a desired temperature, it also makes it impractical to adjust the temperature in different rooms to suit the needs of occupants in those rooms. Consequently, room temperatures cannot be personalized.

To overcome some of these problems, some buildings are zoned. Each zone has an associated thermostat to adjust the temperature in that zone. In private homes, this is often implemented by installing a separate HVAC system for each zone. Each zone has its own thermostat, fan, heat exchange, furnace or heat pump, cooling compressor, ducts, etc. This is not only expensive; it can also be extremely wasteful of energy. For example, there is usually nothing to prevent one HVAC zone from heating a portion of a building while another HVAC zone cools another, possibly overlapping, region of the building.

Attempts to solve the multi-zone HVAC problem often include installing a centralized control system coupled to various thermostats and, in some cases, to electrically or pneumatically operated dampers in the ducts. However, such centralized systems require installing wiring to the thermostats, dampers, etc., thereby increasing the difficulty of retrofitting existing buildings. These systems are, therefore, more suitable for new construction than for renovating existing buildings. Furthermore, once such a system is installed, it is difficult to subdivide it into additional zones or to incrementally expand the system.

Prior art electronically controlled register vents for zone heating and cooling are described in U.S. Pat. No. 7,168,627 to Lawrence Kates, et al. A design for a multi-zone HVAC control system from an existing single-zone system using wireless sensor networks is described by Andrew Redfern, et al., in Smart Structures, Devices and Systems III, edited by Said F. Al-Sarawi, Proc. of SPIE, Vol. 6414 (2007). The contents of both these documents are incorporated herein by reference.

SUMMARY OF THE INVENTION

An embodiment of the present invention provides a system for controlling an HVAC system of a type having a plurality of HVAC vents. Each HVAC vent may be disposed in a corresponding location in a building, such as to provide heat or air conditioning to a region of the building. The system for controlling the HVAC system may include a corresponding plurality of intelligent controlled registers. Each intelligent controlled register is associated with a distinct one of the HVAC vents. Each one of the intelligent controlled registers is in communication with at least one other of the plurality of intelligent controlled registers. Each intelligent controlled registers executes an autonomous local control program. The control program processes data provided by each of the other intelligent controlled registers. Consequently, the plurality of intelligent controlled registers collectively control the plurality of HVAC vents on a peer-to-peer basis.

At least one of the plurality of intelligent controlled registers may be in wired or wireless communication with at least one other of the plurality of intelligent controlled registers.

Each one of the plurality of intelligent controlled registers may be configured to automatically determine presence of an intelligent controlled register that is not part of the system for controlling the HVAC system. If such an (uninstalled) intelligent controlled register is detected, each intelligent controlled register of the HVAC control system may automatically ascertain if the determined (uninstalled) intelligent controlled register should be added to the system for controlling the HVAC system. If so, the determined (uninstalled) intelligent controlled register is automatically added to the system for controlling the HVAC system. In other words, the network of intelligent controlled registers may automatically detect newly-installed intelligent controlled registers and automatically add them to the network.

In another embodiment, a newly-installed intelligent controlled register automatically discovers a network of intelligent controlled registers and automatically installs itself. In this case, each one of the plurality of intelligent controlled registers is configured to automatically determine presence of at least one other of the plurality of intelligent controlled registers and automatically ascertain if the intelligent controlled register should be added to the system for controlling the HVAC system. If so, the intelligent controlled register is automatically added to the system for controlling the HVAC system.

Each intelligent controlled register may be further configured to automatically ascertain if the determined intelligent controlled register should be added to the system for controlling the HVAC system according to timing of air flow through the intelligent controlled register and timing of air flow through the determined intelligent controlled register. Optionally or alternatively, the determination may be made according to timing of light detected by the intelligent controlled register and timing of light detected by the determined intelligent controlled register.

Each intelligent controlled register may be configured to detect other newly-installed components of the network. For example, the intelligent controlled register may be configured to detect wirelessly automatically determine presence of a thermostat that is not part of the system for controlling the HVAC system and automatically ascertain if the determined thermostat should be added to the system for controlling the HVAC. If so, the determined thermostat may be automatically added to the system for controlling the HVAC system.

The intelligent controlled register may be further configured to automatically ascertain if the determined thermostat should be added to the system for controlling the HVAC system according to timing of light detected by the thermostat and timing of light detected by the intelligent controlled register or according to timing of temperature changes detected by the thermostat and timing of temperature changes detected by the intelligent controlled register.

Each intelligent controlled register may include a controllable damper. The intelligent controlled register may be configured such that, when air flows through the controllable damper, at least one of the dampers of the plurality of intelligent controlled registers is fully open.

Each intelligent controlled register may be configured to wirelessly receive data from at least one other of the plurality of intelligent controlled registers and to forward at least some of the received data to a different at least one other of the plurality of intelligent controlled registers.

The HVAC system may include a ducted air handling system, a hydronic system and/or an electric resistance heating system. At least one of the plurality of intelligent controlled registers may be configured to control a valve and/or to control an electrical switch of a proportional control device.

Each intelligent controlled register may include a motor coupled to a controllable damper, a temperature sensor and a wireless transceiver for communicating with at least one other of the plurality of intelligent controlled registers. A controller may be coupled to the motor, to the temperature sensor and to the transceiver. A power source may be coupled to the motor, to the transceiver and to the controller. The controller may be configured to carry out processes, such as obtaining data from the temperature sensor and, via the wireless transceiver, data from at least one other of the plurality of intelligent controlled registers. Using the obtained data, the controller may automatically determine a desired operation of the damper and drive the motor to cause the desired operation of the damper.

The power source may include an array of photovoltaic cells and/or a fan-powered generator. The controllable damper of at least one of the plurality of intelligent controlled registers may include a valve. Each of at least one of the plurality of intelligent controlled registers may be mounted in an air register.

The motor may include a coil, and each intelligent controlled register may further include a circuit board on which are mounted electronic circuits implementing at least a portion of the controller. The coil of the motor may be mounted directly to the printed circuit board.

The circuit board may further include a plurality of electrically conductive elements, and the motor may further include a conductive element spaced apart from the plurality of electrically conductive elements to form a capacitor between the conductive element in the motor and one or more of the plurality of electrically conductive elements on the printed circuit board. Capacitance of the capacitor depends on a rotational position of the motor. The controller may be configured to ascertain the rotational position of the motor based on the capacitance of the capacitor.

The motor may include two sets of rotors and two sets of stators. One of the rotors and one of the stators may form a first "submotor" and the other one of the rotors and the other one of the stators may form a second "submotor." The two submotors may be disposed beside each other and geared together.

The system for controlling an HVAC may further include a portable remote control unit that includes a wireless transmitter and at least one user-actuateable control. The intelligent controlled register may be configured to receive a wireless signal from the portable remote control unit. The controller may be configured to automatically determine the desired operation of the damper based, at least in part, on the received wireless signal from the portable remote control unit.

The wireless transmitter of the portable remote control may include a line-of-sight wireless transmitter and/or a wireless line-of-sight detector.

Each of the plurality of intelligent controlled registers may include a volume control damper configured to adjustably control an amount of heat delivered through the intelligent controlled register. A motor may be under control of the autonomous control program and mechanically coupled to operate the volume control damper. A printed circuit board may include electronic circuits and windings of the motor. The motor may be a stepper motor.

The system for controlling an HVAC system may also include a volume control damper position indicator that includes at least two electrically conductive elements spaced apart by a dielectric, such as air, thereby forming a capacitor. At least one of the at least two electrically conductive elements may be configured to move, with respect to the other of the at least two electrically conductive elements. The movement may be in relation to the operation of the volume control damper, so as to vary capacitance of the capacitor in relation to the operation of the volume control damper.

Each of the plurality of intelligent controlled registers may be configured, absent an external input specifying a setpoint temperature for the corresponding location, so as to equalize temperatures of the locations in the building.

Each of the plurality of intelligent controlled registers may be configured so as to maximize flow through at least one of the plurality of intelligent controlled registers.

The HVAC system may include a blower and a heating or cooling unit. At least one of the plurality of HVAC vents may include a return vent, and at least one of the plurality of HVAC vents may include a supply vent. The system may further include a thermostat coupled to the HVAC system so as to control the blower and coupled to at least one of the plurality of intelligent controlled registers. Each of the plurality of intelligent controlled registers may be configured to operate so as to permit air to be drawn in by an automatically selected at least one of the return vent. The air may be moved by the blower, and the air may be exhausted through an automatically selected at least one of the supply vent, all without operating the heating or cooling unit. Thus, air may be transferred from at least one automatically selected location in the building (such as a room where the air is too hot) to another at least one automatically selected location in the building (such as a room where the air is too cold).

The HVAC system may include a blower controlled by blower control leads and a heating or cooling unit controlled by heating or cooling unit control leads. The HVAC control system may further include a thermostat coupled to the HVAC system so as to control the blower and the heating or cooling unit. The thermostat may be further coupled to at least one of the plurality of intelligent controlled registers. The thermostat may be configured to automatically identify: power leads connected to the thermostat, the blower control leads connected to the thermostat and the heating or cooling unit control leads connected to the thermostat.

An embodiment of the present invention provides a system for controlling an HVAC system of a type having a plurality of HVAC vents. Each HVAC vent may be disposed in a corresponding location in a building, such as to provide heat or air conditioning to a region of the building. The HVAC control system may include a corresponding plurality of intelligent controlled registers. Each intelligent controlled register may be associated with a distinct one of the HVAC vents. Each intelligent controlled register may include a motor coupled to a controllable damper, a temperature sensor and a wireless transceiver for communicating with at least one other of the plurality of intelligent controlled registers. A controller may be coupled to the motor, to the temperature sensor and to the transceiver. A power source may be coupled to the motor, to the transceiver and to the controller. The controller may be configured to carry out processes, such as obtaining data from the temperature sensor and, via the wireless transceiver, data from at least one other of the plurality of intelligent controlled registers. Using the obtained data, the controller may automatically determine a desired operation of the damper; and drive the motor to cause the desired operation of the damper.

Yet another embodiment of the present invention provides a method for controlling an HVAC system of a type having a plurality of HVAC vents, in which each HVAC vent is disposed in a corresponding location in a building. The HVAC control system may include a corresponding plurality of intelligent controlled registers. Each intelligent controlled register may be associated with a distinct one of the HVAC vents. Data is obtained from a temperature sensor. In addition, data is wirelessly obtained from at least one other of the plurality of intelligent controlled registers. The obtained data is used to automatically determine a desired operation of a damper. A motor is driven to cause the desired operation of the damper.

Presence of an intelligent controlled register that is not part of the system for controlling the HVAC system may be wirelessly automatically determined. The determined intelligent controlled register may be automatically added to the system for controlling the HVAC system.

Data may be wirelessly received from at least one other of the plurality of intelligent controlled registers. At least some of the received data may be forwarded to a different at least one other of the plurality of intelligent controlled registers.

Electrical power may be generated with an array of photovoltaic cells and/or with a fan-powered generator at least one of the plurality of HVAC vents. The motor may be powered at least partially by the generated electrical power.

The motor may adjust vanes of an air volume control damper, adjust a valve, adjust an electrically controlled switch and/or adjust an electrically controlled proportional control device.

A wireless signal may be received from a portable remote control unit. The received wireless signal may be used to obtain the data to automatically determine a desired operation of a damper.

Another embodiment of the present invention provides an intelligent controlled register for use in an HVAC system of a type having a plurality of HVAC vents. Each HVAC vent may be disposed in a corresponding location in a building. The intelligent controlled register includes a motor coupled to a controllable damper, a temperature sensor, and a wireless transceiver for communicating with at least one other intelligent controlled register, A controller may be coupled to the motor, to the temperature sensor and to the transceiver. A power source may be coupled to the motor, to the transceiver and to the controller. The controller may be configured to carry out processes, such as obtaining data from the temperature sensor and, via the wireless transceiver, data from at least one of the at least one other intelligent controlled register. The controller may use the obtained data to automatically determine a desired operation of the damper and drive the motor to cause the desired operation of the damper.

BRIEF DESCRIPTION OF THE DRAWINGS

The invention will be more fully understood by referring to the following Detailed Description of Specific Embodiments in conjunction with the Drawings, of which:

FIG. 21 is a schematic block diagram of an exemplary data packet, according to an embodiment of the present invention;

FIG. 22 is a schematic block diagram of an exemplary a device settings data packet, according to an embodiment of the present invention;

FIG. 23 is a schematic block diagram of an exemplary a remote command packet, according to an embodiment of the present invention;

FIG. 24 is a schematic block diagram of an exemplary remote standard update packet, according to an embodiment of the present invention;

FIG. 25 is a schematic block diagram of an exemplary remote settings update packet, according to an embodiment of the present invention; and FIG. 26 is a schematic block diagram of an exemplary device information table, according to an embodiment of the present invention.

DETAILED DESCRIPTION OF SPECIFIC EMBODIMENTS

Definitions. As used in this description and the accompanying claims, the following terms shall have the meanings indicated, unless the context otherwise requires:

"HVAC system" means a system that provides heat, ventilation and/or air conditioning to a building or a portion of a building. An HVAC system may provide one or more such functions.

"Array of photovoltaic cells" means one or more cells that convert light into electricity by the photovoltaic effect.

"Hydronic" means the use of water as a heat-transfer medium in a HVAC heating or cooling system. Examples of heating systems include steam and hot-water radiators. In large-scale commercial buildings, such as high-rise and campus facilities, a hydronic system may include a chilled water loop and a heated water loop to provide for both heating and air conditioning. Chillers and cooling towers may be used separately or together to provide water cooling, while boilers may be used to heat water.

A "controllable damper" is a device that controls heat transfer into or out of a region associated with a location in a building. In an air-based HVAC system, a controllable damper may be implemented by an adjustable register in a vent, such as by an adjustable vane. The register may be binary, i.e., the register may have exactly two possible states (such as partially or fully closed and partially or fully open), or the register may be step-wise or continuously variable between two extreme states, i.e., the register may have more than two possible states. In a hydronic HVAC system or in an electric resistance heating system, a controllable damper may be implemented by an adjustable regulator, similar to that used in an air-based HVAC system, to control air flow through or near a heat exchanger, such as a radiator. Optionally or alternatively, a hydronic controllable damper may be implemented by a valve to control flow of water, steam or another fluid.

Figure 1:
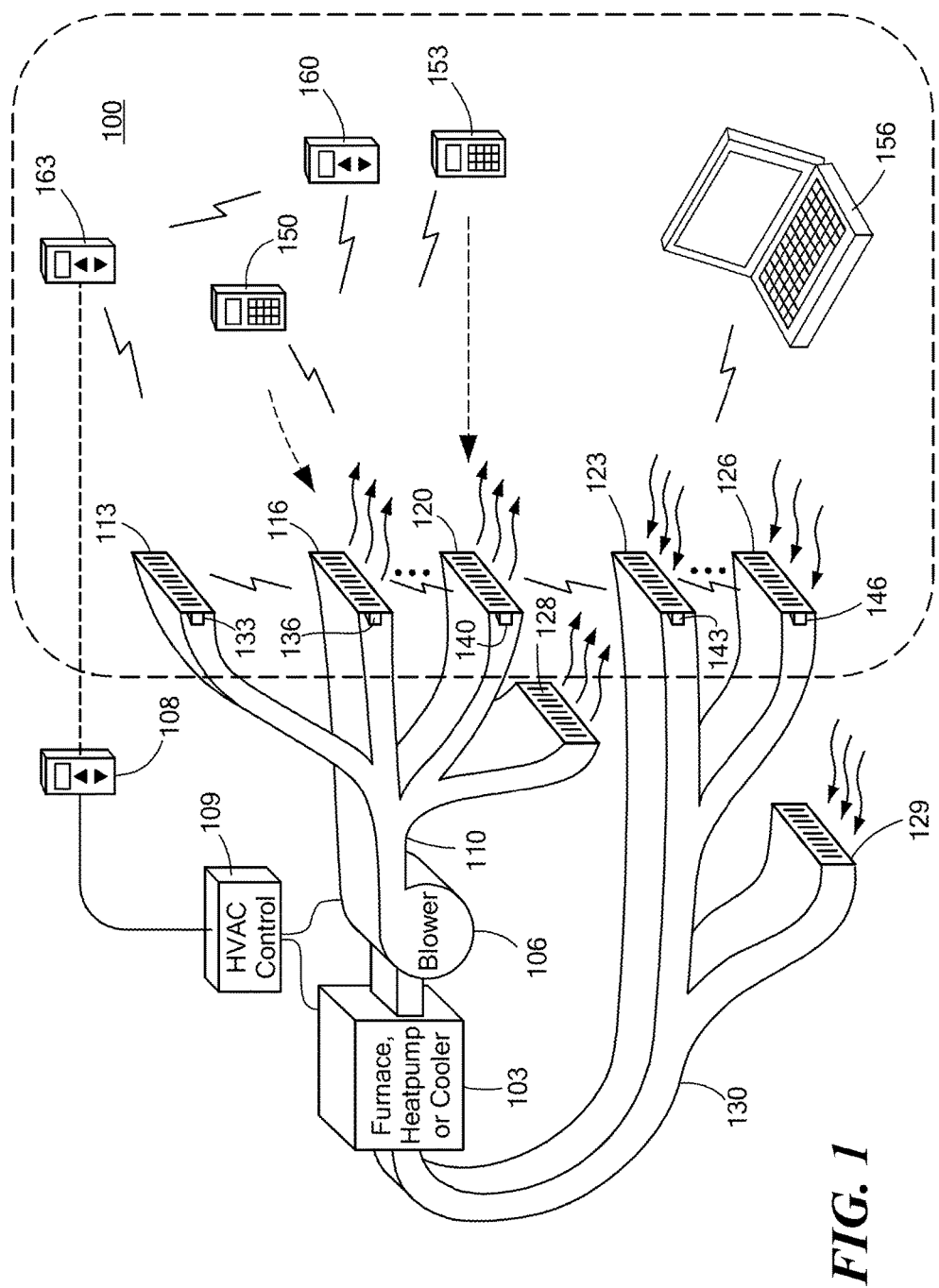
FIG. 1 is a schematic diagram of an HVAC system in which embodiments of the present invention may be practiced.

Embodiments of the present invention provide methods and systems for controlling HVAC systems in a distributed manner. In various embodiments, such control is achieved by providing intelligent register controllers that operate in a peer-to-peer manner. FIG. 1 is a schematic diagram of an air-based HVAC control system 100 (enclosed within a dashed line) that includes components, and that performs processes, in accordance with an embodiment of the invention. Each intelligent register controller automatically determines how much conditioned air to allow into its region, or how much return air to allow to be withdrawn from its region, based on information collected by the register controller, such as: current temperature of the region; desired temperature of the region; calculated amount of conditioned air required to change the region's temperature to the desired temperature; temperature of conditioned air begin supplied by a duct to the register; current time, day of week, vacation or other schedule data; temperatures of other regions and their respective desired temperatures; calculated amounts of air required to be supplied or withdrawn by the other controlled registers to change their respective regions' temperatures to their desired temperatures; or combinations thereof. However, as will be described below, other embodiments of the present invention employ similar components and similar principles to control other types of HVAC systems, such as hydronic or electric resistance heating systems.

As shown in FIG. 1, a furnace, heat pump, cooler and/or other device or combination of devices 103 heats or cools air that is then moved through the HVAC system by a blower 106. (The blower 106 may be coupled to the input, rather than to the output, of the heating/cooling device 103.) A conventional thermostat 108 and a conventional HVAC control unit 109 control operation of the heating/cooling device 103 and the blower 106. Optionally or alternatively, the air may be filtered and/or exchanged for outside air, etc. (not shown). For simplicity of explanation, the air is referred to herein as being "conditioned," regardless of how the air is treated, i.e., heated, cooled, etc.

The conditioned air is carried by a series of ducts 110 to a plurality of HVAC vents, such as supply registers 113, 116, 120 and 128. Of course, there may be more or fewer supply registers and more or less complex duct work than are shown in FIG. 1. The supply registers 113-120 and 128 may be disposed in various locations of a building, such as in walls of rooms of a house, in walls or ceilings of corridors or in ceilings of an office building. One or more of the supply registers 113-120 and 128 may be in a given room. Each supply register 113-120 and 128 may introduce conditioned air into its respective region. Return registers 123, 126 and 129 and an associated return duct 130 return air to the heating/cooling device 103. Of course, there may be other numbers of return registers and more or less complex return duct work.

One or more of the supply registers 113-120 and 128 may include a respective intelligent register controller 133, 136 and 140. Each register controller 133-140 operates a controllable damper to control the amount of conditioned air the corresponding supply register 113-120 allows into its respective region. In addition, each register controller 133-140 measures the temperature of its respective region.

Optionally, one or more of the return registers 123-129 also includes a register controller 143 and 146 that controls the relative amount of air allowed to be drawn from its respective region back into the HVAC system. A register 113-120 and 123-126 that is equipped with a register controller may be referred to herein as an "intelligent controlled register" or simply a "controlled register."

The amount of air permitted to flow through a register 113-126 may be controlled by any suitable structure, such as a motorized adjustable vane or a set of vanes in the register. Each controlled register's controller 133-146 operates its respective vane(s).

The controlled registers 113-126 and the register controllers 133-146 are not, however, centrally controlled. Furthermore, the register controllers 133-146 need not necessarily be connected to the heating/cooling system thermostat 108, the blower 106, the HVAC control unit 109 or the heating/cooling device 103. The register controllers 133-146 form a wireless communication network, by which the register controllers 133-146 (and optionally other components of the HVAC control system 100, collectively referred to as "nodes" of the network) can provide information to other register controllers 133-146 in the network.

Each register controller 133-146 automatically determines how much conditioned air to allow into its region, or how much return air to allow to be withdrawn from its region, based on information collected by the register controller 133-146. This information may include: the current temperature of the region; a desired temperature of the region; a calculated amount of conditioned air required to change the region's temperature to the desired temperature; temperature of conditioned air begin supplied by a duct to the register; current time, day of week, vacation or other schedule data; temperatures of other regions and their respective desired temperatures; calculated amounts of air required to be supplied or withdrawn by the other controlled registers to change their respective regions' temperatures to their desired temperatures; charge state of a battery powering the register controller 133-146 or a combination thereof. Based on the determination of the amount of conditioned air required, each register controller 133-146 automatically determines when to operate its respective controllable damper and an extent to which the controllable damper should be opened or closed, and the register controller 133-146 operates the controllable damper. It should be noted that a register's controllable damper may be opened for only a portion of the amount of time the blower 106 is operating.

Each node of the network may base its operation at least in part on information about one or more (ideally all) of the other nodes in the network. Thus, the intelligent register controllers 133-146 (and optionally other nodes) of the network collectively control the amount of conditioned air introduced into each region. This control function is distributed across the network of intelligent controlled registers. Significantly, this control function does not use a central controller. That is, no central controller instructs each register controller how and when to operate its controllable damper. None of the register controllers 133-146 is a "master" that controls the other register controllers. A remote control unit 150-153 (described in more detail below) or a central node, such as a computer 156, may provide information about desired temperatures, set-back times, etc. However, by sending this information, the remote control unit 150-153 or the computer 156 does not command a register controller 133-146 to open or close its controllable damper. Instead, the register controllers 133-146 use this information as part of their calculations to determine when and to how to operate their respective controllable dampers.

Each register's controller 133-146 includes a wireless transceiver that enables the register controller 133-146 to wirelessly communicate with other register controllers 133-146 in nearby registers 113-126. The ducts 110 and 130 may act as waveguides to carry wireless signals or otherwise facilitate the wireless communication among the register controllers 133-146. Nevertheless, all the register controllers 133-146 may not be able to directly wirelessly communicate with all the other register controllers 133-146, due to limitations on transmitter power, distances involved, electromagnetic interference (EMI), battery charge level, etc. Therefore, each register controller 133-146 relays data it receives from other register controllers 133-146 to yet other register controllers 133-146. Thus, each register controller 133-146 may ultimately receive information about every other register controller 133-146 in the HVAC control system 100, albeit not necessarily directly from the register controller about which the information is provided.

Any number of (including zero) hand-held remote control units, exemplified by remote control units 150 and 153, may be used. These remote control units wirelessly communicate with register controllers 133-146 in nearby registers 113-126, although the communication between a remote control unit 150-153 and a register controller 133-146 may involve a different medium (such as infrared light-based communication or radio frequency (RF)-based communication) or a different frequency than the communication among the register controllers 133-146. Each remote control unit 150-153 includes a keyboard and a display, by which a user may instruct the HVAC control system 100 or a component thereof to change a parameter, such as a desired temperature in the region where the user is located. Optionally, one or more of the remote control units 150-153 may be attached to fixed locations, such as on walls, in the building.

Optionally, one or more network thermostats, exemplified by network thermostat 160, may be included in the HVAC control system 100. The network thermostat 160 may be installed in a region, such as mounted on a wall of a room, to allow the user to directly set a desired temperature or temperature program for the near-by area. Like the registers, the thermostats automatically detect and connect to an existing network, but unlike the registers, never create a new network. The primary function of the network thermostat is to inform the registers of the desires of the system user, and to provide sufficient information on its environment so that each register may determine if it is to use the set point information. For example the network thermostat may record and report to the network the times of sudden increase or decrease in light level, presumably caused by someone turning on a light or opening a door or a window shade. Any register observing the same environmental changes would then assume that it is near that thermostat, and should use that thermostats temperature set point as its temperature goal. The network thermostat 160 may be powered by a photovoltaic cell and/or a conventional user-replaceable battery.

Optionally, one or more of the network thermostats, exemplified by network thermostat 163, may be connected to (or replace) the thermostat 108. Optionally or alternatively, the network thermostat 163 may be connected to the HVAC control 109, or the network thermostat 163 may be otherwise connected to the HVAC system. In either case, the network thermostat 163 may control operation of the heating/cooling device 103 and/or the blower 106. For example, if one region is warmer than it needs to be, while another region is cooler than it needs to be, the HVAC control system 100 may move some air from the warm region to the cool region by opening controllable dampers in the respective regions, closing other controllable dampers, and causing the blower 106 (but not the heating/cooling device 103) to operate. One or more controllable return registers 123-126 proximate the region from which air is to be move may be opened while controllable return registers proximate other regions may be closed, and one or more controllable supply registers 113-120 proximate the region to which the air is to be moved may be opened while controllable supply registers proximate other regions may be closed. A network thermostat that is electrically connected to the thermostat 108, etc. may be powered by the HVAC system and need not, therefore, necessarily include a photovoltaic cell.

As noted, the register controllers 133-146 receive information about the other register controllers 133-146. Using this information, as well as information about a desired temperature in the region serviced by a given register controller 133-146, the register controller 133-146 determines a desired operation of an controllable damper in its corresponding controlled register, and the register controller 133-146 drives a servo, such as a stepper motor and position sensor, to cause the desired operation of the damper. Thus, the register controller 133-146 controls the amount of conditioned air introduced into its region or withdrawn from its region, in order to meet (as well as possible, given the capacity of the heating/cooling device 103 and the blower 106, ambient conditions, etc.) the desired temperature. Absent information from any remote control unit 150-153, computer 156 or network thermostat 160-163 about a desired temperature, the register controllers 133-146 may operate so as to equalize the temperatures of all the regions. Thus, in an installation with a single conventional HVAC thermostat 108, which is not connected to the network of registers, and the addition of only the controlled registers 113-126 may operate to equalize the temperature in all the rooms of a house. This feature, alone, provides a significant improvement in comfort level and energy savings (by avoiding over-heating one or more of the rooms to satisfy the thermostat 108) over prior art HVAC control systems.

Installation

One or more components of the HVAC control system 100 may be installed in a new HVAC system, or one or more components of the HVAC control system 100 may be retrofitted into an existing structure. In either case, later, addition components of the HVAC control system 100 may also be installed.

Upon being installed, each new component attempts to communicate with other components of the HVAC control system 100 that are within range of the newly installed component's wireless transceiver. The newly installed component then identifies which, if any, of these other components are part of the same HVAC system as the newly installed component. (It should be noted that there may be components installed in unrelated HVAC systems that are within wireless communication range, such as HVAC systems in nearby homes or on other floors of a multi-story building, and the newly installed component should ignore these unrelated components.) A process of discovering other components is described in the context of installing a register controller; however, a similar process may be used by other types of components.

A newly installed register controller 133-146 monitors the communications of other register controllers that are within range of the newly installed register controller's wireless transceiver. By comparing environmental data received from the discovered network, such as the time that air flow starts and stops, with its own measurements, the register determines if it should, or should not join that network. Components with photovoltaic cells may optionally or alternatively note times at which light intensities (presumably due to the apparent movement of the sun or artificial lighting) are high or low and correlate the detected lighting level patters with other light-sensitive components, as described in more detail below. If the discovered network is in the same environment as the new register, it joins that network. Register controllers 133-146 may routinely send information about their respective air flow times, light level patterns, etc., or the register controllers 133-146 may be queried by the newly installed register controller for this information.

Similarly, the network thermostats 160-163 should experience environmental changes that correlate well with nearby registers.

Although in some embodiments components use timings of air flows or temperature changes to facilitate automatically discovering other components, this automatic discovery may be based on timings of other environmental changes, such as humidity or light. For example, as noted below, the controlled registers may include photovoltaic cells to power the register controllers 133-146. Using timings and strengths of signals from these photovoltaic cells, the register controllers 133-146 may correlate times at which relatively strong light, such as sunlight, shines on the photovoltaic cells, or times at which relative weak light, such as artificial light from interior lamps, or no light shines on the photovoltaic cells.

If the newly installed register controller 133-146 fails to find a network using the same HVAC system, the newly installed register controller 133-146 forms a new network and operates alone, until another register controller 133-146 or network thermostat 160-163 that is part of the same HVAC system comes within range and joins its network. The network thermostats 160-163 perform similar operations upon their installation.

Thus, each register controller 133-146 and network thermostat 160-163 is essentially self-installing, in that no user involvement is required to interconnect the register controllers 133-146 or the network thermostats 160-163 to each other. The user only needs to put the registers and thermostats where he wants them. The HVAC system 100 facilitates incremental growth; components may be added at any time, and not all register need to be equipped with register controllers. Consequently, a building owner may install register controllers in a few selected locations, such as rooms that are chronically too hot or too cold, so as to enhance comfort in these regions. In another scenario, the building owner may install register controllers 133-146 in locations that are frequently unoccupied, so as to save energy by minimizing the amount of conditioned air supplied to these regions. While installation of register controllers 133-146 in less than all the registers of an HVAC system may not be optimum, such an installation may provide the greatest saving or comfort improvement for the corresponding investment, i.e., the cost of the controlled registers. A number of features make automatic self-installation possible. Among these are a self-initializing communications network, an ability to determine if two components are in the same system, an ability to determine relative location and elimination of a fixed temperature target (replaced by equalizing temperature via an assumed set point).

Intelligent Register Controller

The main functions of the intelligent register controller 133-146 are: dynamically control the amount of air allowed to pass through an associated register 113-126; measure air temperature in the associated region (room); measure temperature of air in the associated duct; identify, communicate with and coordinate with other network components; maintain a clock/calendar; generate electrical power to operate the register controller; and communicate with one or more remote control units 150-156.

Figure 2:
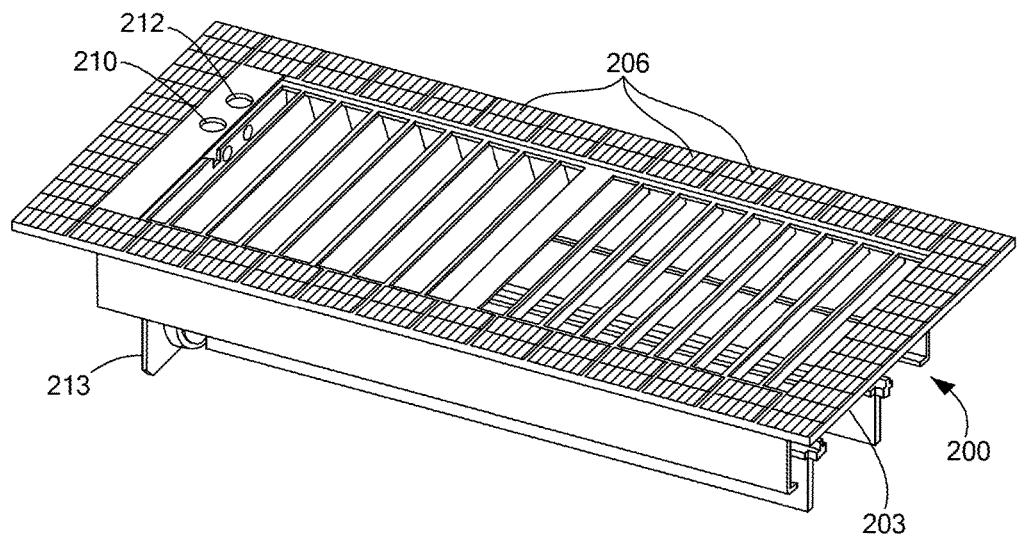
FIG. 2 is a perspective view of the front of an intelligent controlled register, according to an embodiment of the present invention.

FIG. 2 is a perspective view of the front of an exemplary register 200. Much of the face 203 of the register 200 may be covered by, or constructed of, photovoltaic cells, exemplified by photovoltaic cells 206. An indicator, such as a light-emitting diode (LED) 210, may be included to display status information. A circuit board 213 may be attached to the rear, or another convenient portion, of the register 200. The circuit board 213 includes a processor, power control circuits, etc., as described herein.

Figure 3:
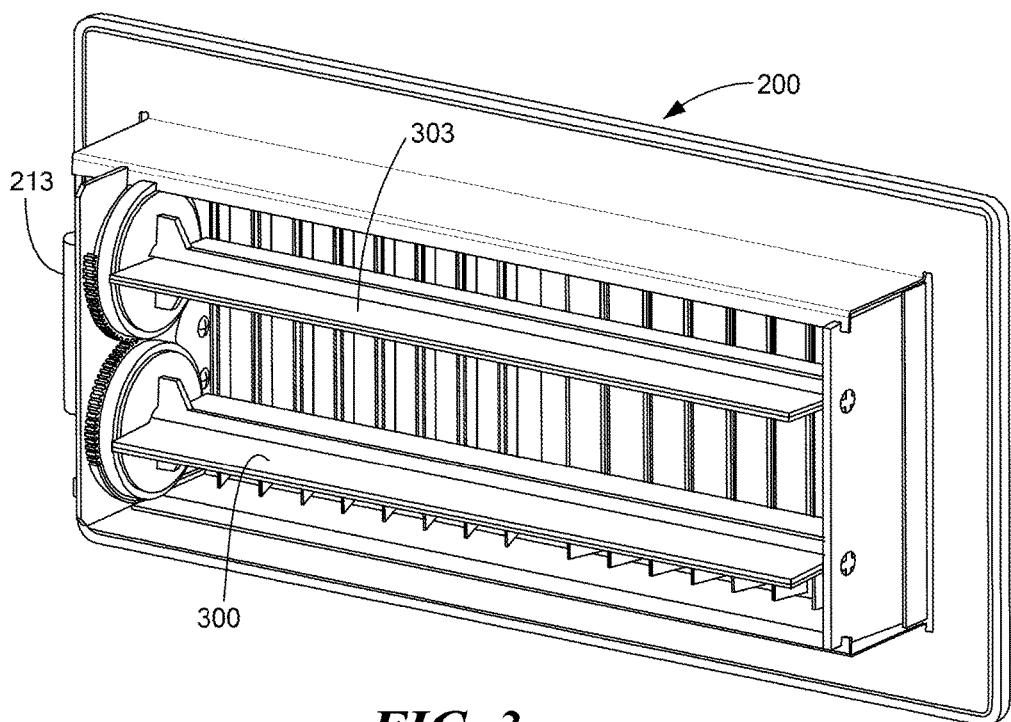
FIG. 3 is a perspective view, from the right, of the rear of the intelligent controlled register of FIG. 2.

FIG. 3 is a perspective view of the rear of the register 200. A controllable damper, here exemplified by two counter-rotating vanes 300 and 303, is attached to the register 200 to control air flow through the register 200. The controllable damper may be operated by a servo, such as a stepper motor and position sensor (not visible). The controllable damper may be constructed so as to hold its position, such as by friction, without use of power between times the positions of the vanes 300 and 303 are changed by the servo motor 306. A high pole count motor, such as a stepper motor, may be used. Natural magnetic detents provided by the poles may be used to hold the controllable damper in place. The position of the controllable damper may be manually adjusted by a user, such as by a thumb wheel (not shown), in case the register controller fails. Return registers 123-126 should be equipped with controllable dampers that fail in an open state, so that if such a register fails, air may still return via the register.

Figure 4:
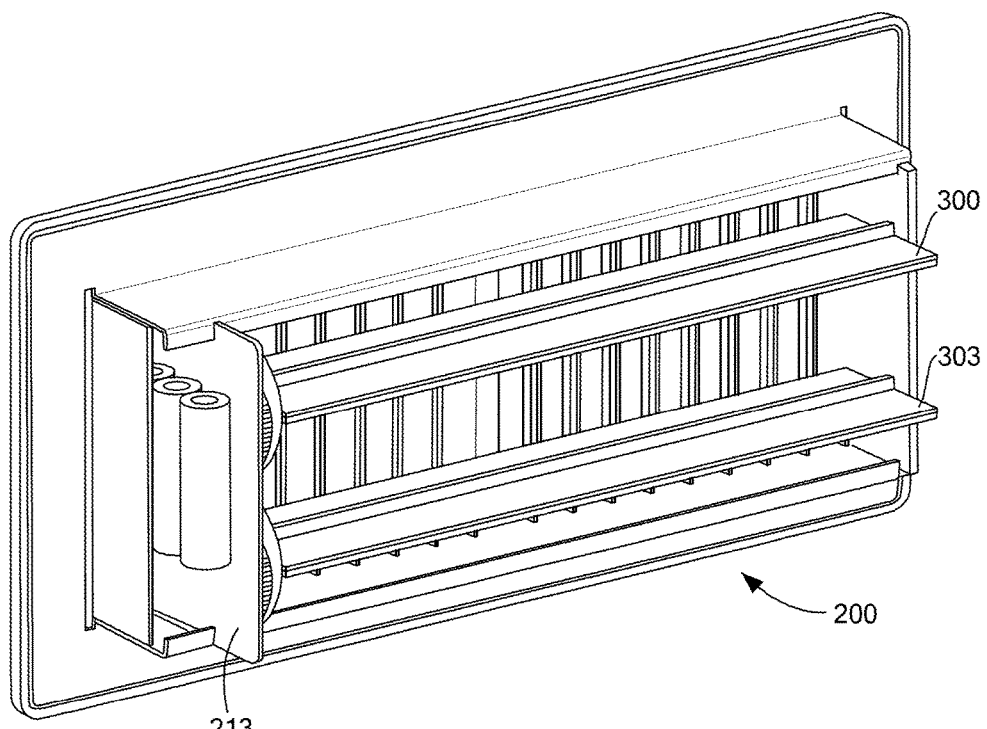
FIG. 4 is a perspective view, from the left, of the rear of the intelligent controlled register of FIG. 2.
Figure 5:
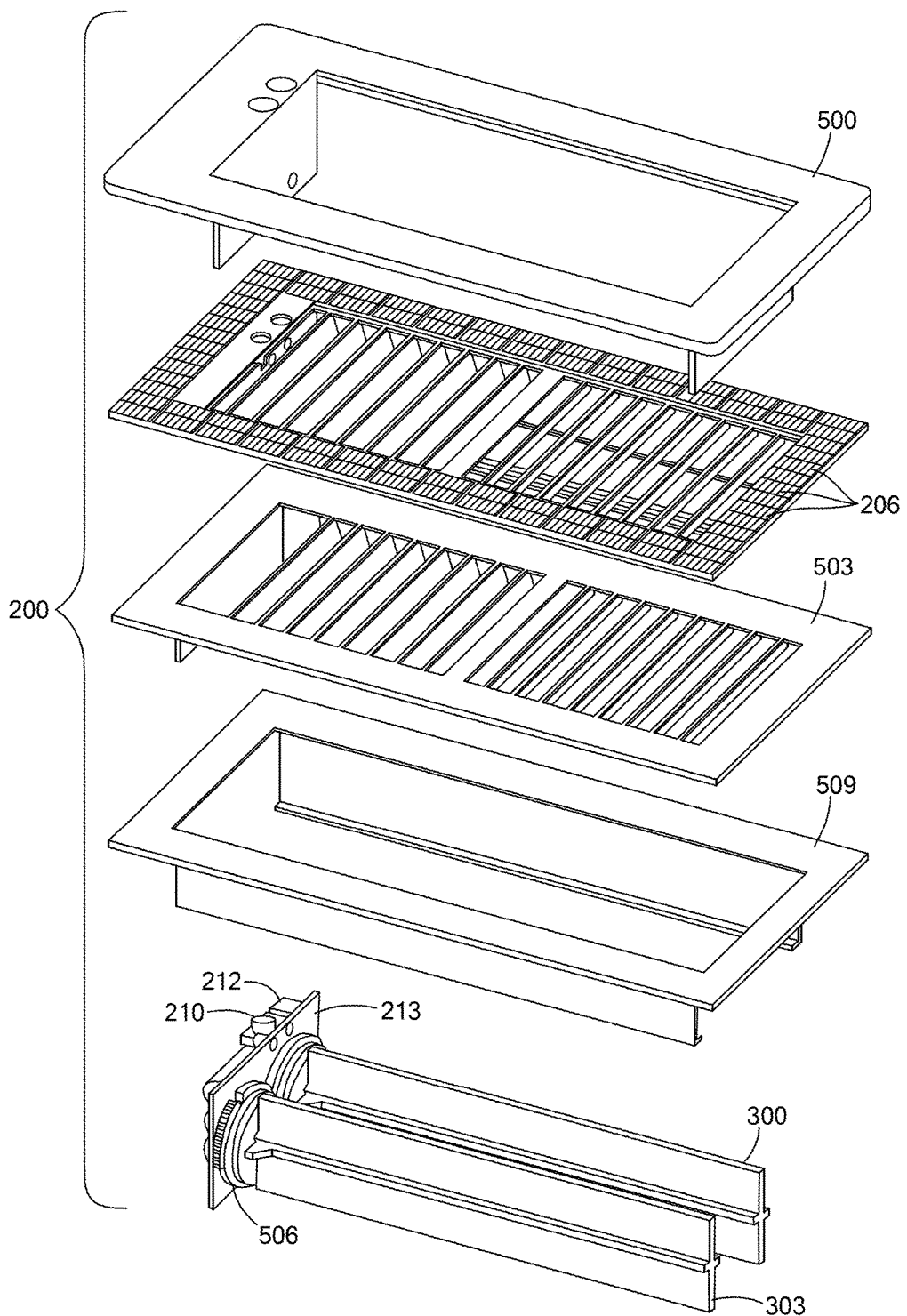
FIG. 5 is an exploded perspective view of the intelligent controlled register of FIG. 2.

FIG. 4 is another perspective view of the rear of the register 200, in which the circuit board 213 may be more clearly seen. FIG. 5 is an exploded view of the register 200. In the embodiment shown in FIG. 5, a transparent front plate 500 covers the photovoltaic cells 206. A perforated grill 503 disperses air flowing through the grill 200. The servo motor 506 is visible in FIG. 5.

Figure 6:
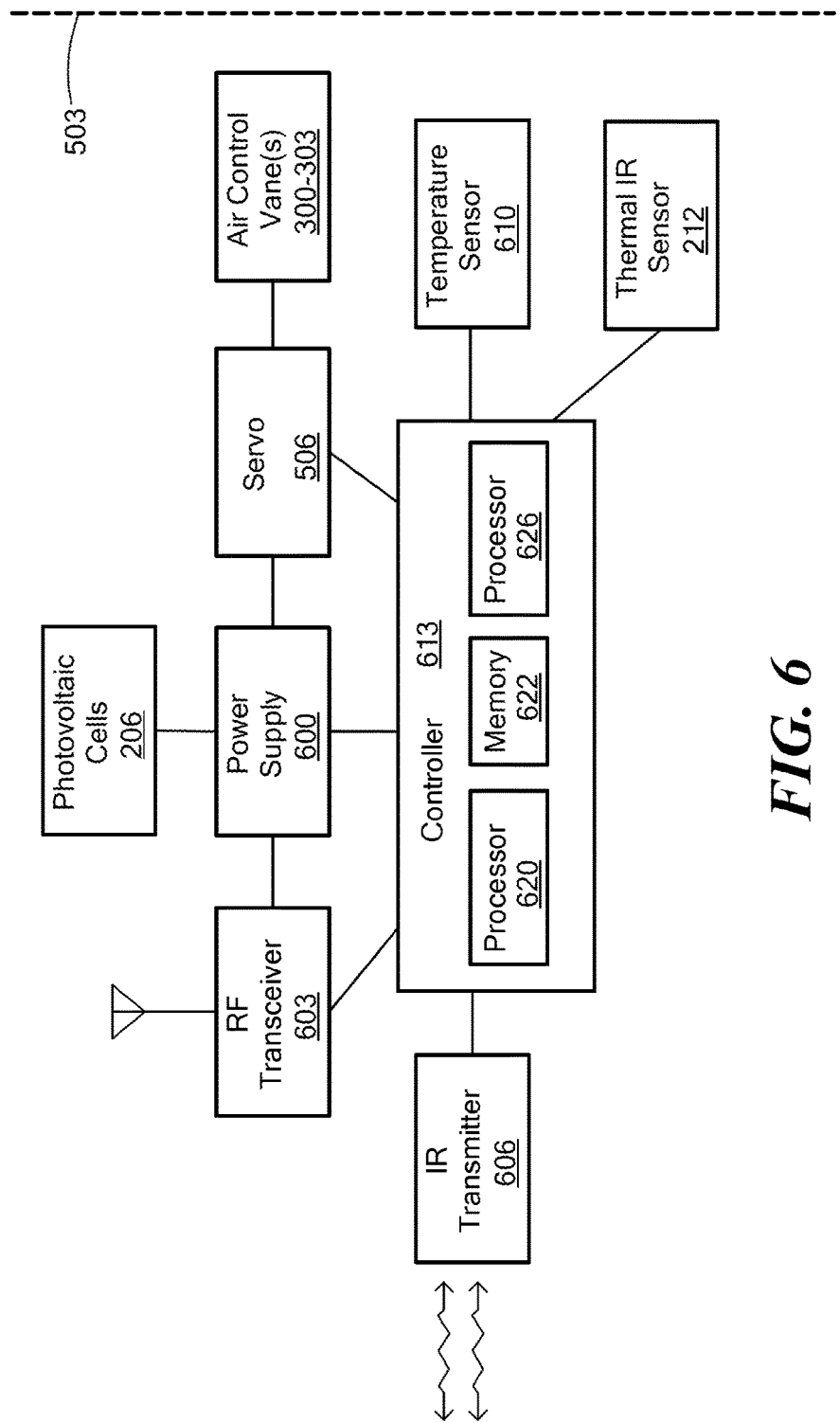
FIG. 6 is a schematic block diagram of the intelligent controlled register of FIG. 2.

FIG. 6 is a schematic block diagram of one of the intelligent register controllers 133-146. The register controller may be implemented by electronic components on, or connected to, the circuit board 213. The photovoltaic cells 206 are connected to a power supply 600, which is described in more detail below. The power supply 600 may include a rechargeable battery, a super capacitor or another suitable energy storage device for powering the remaining circuits when the photovoltaic cells 206 are insufficiently illuminated to directly power the circuits. The register controller may communicate with other network nodes via a wireless transceiver 603, such as an RF transceiver. Among other information, the intelligent register controller may inform other nodes of the amount of energy in its energy storage device, so that network tasks may be allocated to nodes having the greatest power reserves.

An infrared (IR) transceiver (or, in some cases, only a receiver or transmitter) 606 facilitates wireless communication between the register controller and a remote control unit 150-153. One or more temperature sensors 610, such as one or more thermistors, silicon diodes or any other suitable temperature-sensitive components, are located so as to be exposed to air flowing through the register 200. A controller 613 controls operation of the remaining components of the register controller. The controller 613 may be implemented with a processor 620 executing instructions stored in a memory 622. A clock 626 enables the controller 613 to keep track of time and date although, as noted below, the clock may keep track of time according to an arbitrary time zone, such as a time zone based on 12 o'clock corresponding to high noon or high moon, as detected by bright light illuminating the photovoltaic cells.

To minimize power consumption, the baffle should maintain its position without power use. In addition, a user should be able to manually adjust the position of the baffle, in case of a failure of the register. In one embodiment, a high pole count motor, such as a stepper motor, drives the baffle without gearing. The natural magnetic detent properties of such a motor may be used to hold the baffle in place. The baffle, motor, and manual adjustment wheel may be on a common shaft. In the case of multiple baffle blades, which may be used to reduce the depth of the register, one blade may be on the common shaft, and the other blades may be driven by gears or a linkage.

To reduce the parts count, wiring and cost of the stepper motor baffle drive, part of the motor and position sensing device may be mounted on the main printed circuit board. Windings of the motor may be mounted on the circuit board, and permanent magnet pole pieces may be attached to the shaft. A (plated through) hole in the circuit board may provide a shaft bearing to keep the motor parts aligned. A position sensor may also be a part of the board. A capacitance sensor may be formed by pads on the board and rotating segmented plates attached to the shaft. The moving permanent magnet pole piece may be either in the shape of a cup that surrounds a puck-shaped coil assembly attached to the circuit board, or the rotating permanent magnet poles may be in the center of a stationary ring of a coil assembly. In either case, the moving capacitor plates may be attached to the pole piece assembly. The capacitor plates, or the entire baffle-shaft assembly, may be spring mounted to force them into contact with the board, and one of the plates (stationary or moving) may be covered with a thin insulator. The moving plates may be activated by a stationary plate segment on the circuit board, so that no wires to the moving parts may be required.

The manual adjustment of the baffle may be made using a wheel on the baffle shaft that has a large enough diameter so that a chord of the wheel protrudes through a slot in the face of the register. The shaft from the baffle to the wheel may be made slightly flexible, so that pushing the wheel into the face of the register (caused, for example, by someone stepping on the register) does not cause damage.

Clock

Each register controller 113-146 maintains several clock times and several states related to these times. The most fundamental time in each register controller 113-146 is a unit time (UT) clock. This is a count that is initialized to zero when the register controller 113-146 is manufactured and is incremented at a fixed rate as long as the register controller's processor 620 is powered up. This time has enough resolution to record the time of events as accurately as needed, such as within 1/256 second. The accumulator for this time has enough bits, such as 40 bits, that it will not overflow during the expected lifetime of the register controller. If the processor 620 detects that it will soon run out of power, this clock is saved in nonvolatile memory.

As part of the state for this clock, there are three other saved values. One value is the current status of the UT: Resetting or Valid. This status bit is set to "Resetting" from the time that the component saves the UT in preparation for a complete shutdown, due to low power, until power is restored and accumulation resumes. When the UT is again running, its state is changed to "Valid." The second status datum is the value of the UT at the previous power failure, or Last Crash Unit Time (LCUT). This value is initialized at the time of manufacture to zero and is set to the value of the saved UT value when the UT is restarted, and may in fact be the value in nonvolatile memory saved at the time of a power failure. The time since the last power failure may be calculated by subtracting LCUT from the current UT. The processor can ascertain if a stored UT value is valid as a time span measurement by checking that this value is greater than the LCUT. The third value is a count of the number of times that the LCUT has been changed, i.e. the number of processor power failure crashes. This last value is used to determine if a register controller is having frequent power failures and should perhaps be up graded from a light powered register controller to a light and wind or externally powered register controller.

The second "time" each register controller maintains is network time (NT). This is in fact a correction from UT to a time consistent among the members of a network. It is set to the UT of the oldest member of a network. Each network component maintains a signed value which, when added to its UT, gives NT and a status value which is set to Valid after a register joins a network and is given or gives the NT. To prevent disagreements in NT when a new component joins a network, there is a process that first has all components in the network set NT as not valid. The process then distributes the new NT, from which each component computes its correction value, and then the process sets NT as valid.

The last time the register controller maintains is real time. This is also kept as an offset from UT, and a status. The offset is the number of that must be added to UT to produce the local real time in seconds since a predetermined time, such as the beginning of the year 2000. This value has at least two possible statuses: valid and not valid. The status is initialized to not valid and reset to not valid on any crash. The status is set to valid when the register controller is informed of the local time by a remote control unit 150-153 or from another node of the network.

Using the temperature sensor 610, the register controller may ascertain the temperature of conditioned air being delivered to the region. In addition, the register controller may ascertain the speed of the air being delivered, such as by forcing a known electric current through the thermistor for a short time, thereby heating the thermistor above the temperature of the conditioned air, and then measuring the amount of time required for the temperature of the thermistor to drop a predetermined amount, such as to one-half the difference between the heated temperature and the flowing air temperature.

A relationship between air flow speed and temperature drop, as a function of time, may be determined experimentally or algorithmically using known characteristics of the thermistor. Data representing this relationship or representative air speed-temperature drop time value pairs may be stored in a table, such as in the memory 622 of the controller 613. Optionally or alternatively, this relationship may be stored as a mathematical function in the memory 622. The table or function may be used to calculate the air flow speed from the temperature drop time.

After the blower 106 has stopped operating and a suitable amount of time has passed for temperatures within the register to stabilize with the region, the temperature sensor 610 may be used to measure the temperature of the region, thus obviating or reducing the need for a thermometer in the region.

Optionally or alternatively, the conditioned air flow rate may be measured by another sensor (not shown), such as two electrically conductive pads. One of the pads may be fixed on the circuit board 213, and the other pad may be attached to a flexible vane within the path of the conditioned air flow. When the conditioned air flows, it deflects the flexible vane an amount proportional to the air flow rate. The controller 613 measures capacitance between the two pads when the conditioned air flows and when it does not flow. The difference in the two capacitance measurements indicates the amount of vane deflection and, therefore, the air flow rate.

Thus, the controller 613 may ascertain three pieces of information: region temperature, conditioned air temperature and conditioned air flow rate.

By testing for air flow at frequent intervals, the controller 613 may measure the amount of time that the heating/cooling device 103 and/or the blower 106 operate, i.e., an HVAC system "run-time." However, all the controlled registers 112-126 experience air flows at nearly the same time. Therefore, all the register controllers 133-146 need not simultaneously perform their own HVAC system run-time measurements. Instead, only one or a small number of the register controllers 133-146 may need to perform the HVAC system run-time measurement at any point in time, and the run-time information may then be provided to the other register controllers 133-146 in the network. Register controllers 133-146 not performing the HVAC system run-time measurement may be able to enter a low power state, thereby conserving energy. The task of measuring HVAC system run-time may be allocated in a round-robin fashion among the register controllers 133-146. Optionally or alternatively, this allocation may be modified so as to exclusively or more heavily use register controllers 133-146 having the greatest power reserves (i.e., the highest levels of charge in their batteries.

The HVAC system run-time and information about differences between temperatures of conditioned air supplied to regions and the regions' temperatures may be used by one or more nodes of the network to calculate the amount of energy delivered through the registers 112-126. If the energy used by the HVAC system is also known, the efficiency of the HVAC system can be calculated. The energy used by the HVAC system may be input by a user, such as by entering data from energy bills. Alternatively, if the power rating (ex., the kilowatt rating of an air conditioning unit) of the HVAC system components, i.e., the heating/cooling device 103 and the blower 106, are known, the amount of energy used by the HVAC system may be calculated by multiplying the power rating by the amount of time the HVAC system components operate.

Even if the amount of energy used by the HVAC system is not known, relative efficiencies of providing conditioned air to various regions, i.e., through particular controlled registers 113-120, may be calculated by nodes of the network. If one or more of these regions or registers 112-120 operates less efficiently than the others, a node may notify a user, such as by sending a message to a remote control unit 150-153 or to the computer 156 or by illuminating the indicator 210 on the registers 200. This may alert the user to improve thermal insulation of the region and/or decrease infiltration of outside air into the region. Optionally or alternatively, the user may be able to make informed decisions regarding continued heating or cooling of the region, in light of the amount of use the region receives, relative to the amount of energy used to heat or cool the region. Similarly, a sudden decrease in the efficiency of a region may be caused by a window having been left open, and the user may be similarly alerted.

Optionally, each controlled register 113-126 may be equipped with a thermal infrared sensor 212 (FIGS. 2, 5 and 6), positioned and oriented so as to have a view into the region serviced by the controlled register 113-126. This sensor measures black body radiation from the nearest solid object in front of it. The infrared sensor 212 accepts radiation through a window on the face 500 of the register 200, so if the register 200 is mounted in a floor, the infrared sensor 212 may measure the temperature of a ceiling. This measurement can be correlated with the region air temperature measurement made using the temperature sensor 610. Using this correlation, the infrared temperature may be used to compute the region's room air temperature, even when air is passing through the register 200.

Region occupancy information may be advantageously used by the controller 613 to save energy by providing less than the usual amount of conditioned air into a region that has not been occupied for some time. The controller 613 may employ one or more of several methods to ascertain region occupancy. For example, the infrared sensor 212 may be used to detect when a person or animal briefly passes in front of the register 200. Optionally or alternatively, the photovoltaic cells 206 may be used to detect that room lights are on, which may indicate that the room is occupied. A shadow, for example a shadow cast by a passing occupant, briefly passed over the photovoltaic cells 206 may also indicate the region is occupied. In some cases, opening or closing a door to a region alters airflow into or out of the region. Thus, a change in the air flow through the controlled register 113-126, without the controller 613 having caused a change in the air control vanes 300-303, may indicate an occupant entered or exited the region.

Optionally or alternatively, a remote control unit 150-153 may be used by an occupant to indicate that the region is occupied. For example, the remote control unit 150-153 may include a button that, when pressed, indicates the region is occupied. Furthermore, receiving any command, such as setting a desired temperature or a set-back time, issued within a region may be used to infer that the region is occupied. Absence of any indication of occupancy for several minutes may indicate a region is not occupied.

Artificial light can be differentiated from sunlight by the relatively low level of illumination provided by artificial lights and by the rapid increase or decrease in light level when a lamp is switched on or off, compared to the gradual increase or decrease in light level during sunrise or sunset, moon rise or moon set. Thus, daytime versus nighttime may be automatically distinguished, even if the clock 626 is not set. Even without the clock 626 being set, the register controllers 133-146 may share their information about the detection of bright light and, thus, measure the number of daylight hours.

If the system clock 626 has been set, the controller 613 can determine the times of sunrise and sunset by noting times when strong light begins to shine on the photovoltaic cells 206 and when this strong light ceases to shine on the photovoltaic cells 206. Thus, an arbitrary time zone may be created, in which noon is made to correspond to the brightest average light level detected, or alternatively half way between sunrise and sunset, during a series of 24-hour periods.

The thermal infrared sensor 212 may also be used to measure an amount of ambient thermal infrared radiation in the region. Ambient thermal infrared level is an important component of comfort level. By measuring both air temperature and thermal infrared level, the network can maintain a better comfort level. For example, the controlled registers 113-120 may provide less heated air in areas with significant amounts of thermal infrared radiation, such as from windows, thus achieving energy savings.

Power Supply

As noted, the photovoltaic cells 206 provide electric power for the register controller. Optionally or alternatively, a fan (not shown) located in the air flow stream may be used to drive a generator (not shown). The fan should be positioned so it is never occluded by the adjustable damper or such that it is occluded only near the extreme closed state of the damper. Optionally, a primary battery (not shown) and/or an external power supply (not shown) may be used.

Figure 7:
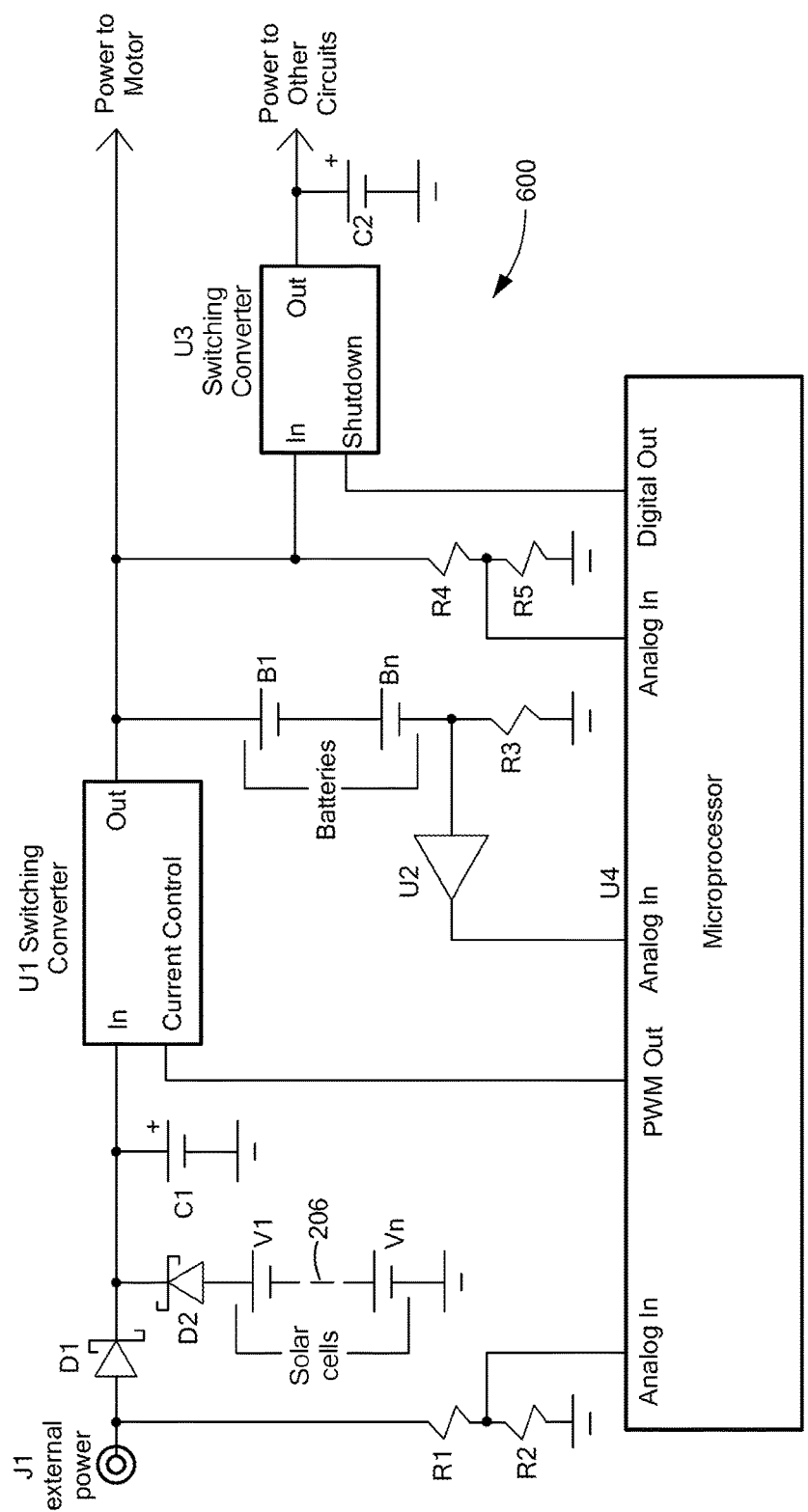
FIG. 7 is a schematic circuit diagram of a power supply for the controlled register of FIG. 2, according to an embodiment of the present invention.

FIG. 7 is a schematic circuit diagram of an exemplary power supply 600. Energy is supplied by photovoltaic cells V1-Vn 206 and/or a fan-powered generator. An optional DC power input may also be provided, so that an external source may also be used. Diodes D1 and D2 combine the power from the external source and the photovoltaic cells (and/or the fan-powered generator) into capacitor C1. Resistors R1 and R2 divide the voltage from the external source to a level tolerable to a microprocessor U4 to allow the two sources to be distinguished. The voltage on C1 is applied to a switching power converter U1. This converter supplies a current output, which is supplied to rechargeable batteries B1-Bn. The current supplied to the rechargeable batteries B1-Bn is controlled, via a switching converter U1, by the microprocessor U4. The microprocessor U4 can also monitor the current in or out of the rechargeable batteries B1-Bn via R3 and amplifier U2. The microprocessor U4 can thus maximize the current into the batteries, thus optimizing utilization of the power out of the solar cells for any light level.

Resistors R4 and R5 divide the voltage from the rechargeable batteries B1-Bn to a level tolerated by the microprocessor U4. The microprocessor U4 is thus able to measure both voltage and current levels in the rechargeable batteries B1-Bn to optimize battery charging.

Power from the rechargeable batteries B1-Bn is supplied directly to the servo motor and also to a switching power converter U3, which provides regulated voltage to the microprocessor U4 and other circuitry in the register controller. Since the microprocessor U4 can ascertain the rechargeable battery B1-Bn voltage, the microprocessor U4 can compensate motor drive signals accordingly. The power converter U3 output is connected to a large capacitor C2 that allows the microprocessor U4 to shut the converter U3 down much of the time, reducing energy used by the converter U3. Other shutdown circuitry (not shown) allows the microprocessor U4 to save additional power by turning devices on only when they are needed. The circuitry is also designed so that rechargeable battery B1-Bn charging occurs automatically, even if the rechargeable battery B1-Bn voltage is too low for microprocessor U4 operation.

Network

The goals of the network include conserving energy and enhancing comfort. The network accomplishes these goals in a number of ways, some of which are summarized in Table 1.

TABLE 1

Network Goals

Maintains desired temperature in all areas (by controlling the amount of conditioned air supplied to each region)
Measures temperature more accurately and accounts for IR background
Eliminates or reduces the overheating or cooling of any area of the home
Simplifies owner initiated temperature setback of selected areas
Simplifies reducing heating/cooling of entire house at selected times
Enables setback when a room is unoccupied
Reduces waste from over-pressure in the ducts
Prompts for or causes the circulation of air from overheated (over-cooled) areas to under heated (under-cooled) areas with HVAC system blower alone
Alarms for energy waste from open doors or windows
Identifies areas that need improved insulation or reduced infiltration
Measures overall system efficiency thereby improving upgrade decisions Although the register controllers 113-146 have been described as having an RF transceiver for communicating with other nodes of the network, other forms of wireless communication, such as ultrasonic or infrared, may be used. Each network node has a unique communications address assigned during manufacture and used for point-to-point communication. This address may also be used as the node's serial number. All nodes also have a common (broadcast) address that all components respond to.

One use for the common address is to allow the handheld remote units 150-153 to discover the unique address of any network node. This is done by pointing the handheld remote unit 150-153 at a node and transmitting a command from the remote control unit 150-153 via the RF transceiver in the remote control unit to all nodes, where the command causes the nodes to transmit their unique addresses via their infrared transceivers 606 (FIG. 6). The remote control unit has an infrared transceiver 816 (FIG. 8) that is directional and only receives this optical signal from the node that the remote control unit 150-153 is pointed at. Once the remote control unit has received a node's unique address, it can communicate with that node explicitly over the normal RF wireless network. The optical path can be used to determine that the user of the remote control unit is still pointing at the same component for all subsequent communications, but in this case a single flash of light from only the node addressed by the remote control unit is sufficient to confirm that the correct node has been addressed. If the remote control unit fails to detect this flash, it will reinitiate the address discovery procedure.

The remote control unit allows the user to select a network component by pointing the remote at it like a gun, but avoids the expense of a separate full duplex high speed optical communications system for each controlled register. The proposed system requires the addition of only a single LED, which can be used for other functions, such as to indicate to the owner that the controlled register is working properly. While the remote control unit must have a light detector, it needs to support only low speed communications that can be run by the microprocessor, without the need for other dedicated hardware.

In some embodiments, a node returns its unique address over the light path. In other embodiments, other systems may be used. For example, because the remote control unit 150-153 normally has a list of all addresses in the system 100, it may sequentially command each of them to flash its (visible or IR) LED until the remote control unit detects a flash. At installation, if the remote control unit has not already acquired the list of unique component addresses, it may use the broadcast address to discover all nodes in range, not all of which may be in the local system 100. Nevertheless, use of optical feedback from the node allows a "point to select" mode to be used.

Each network node has several states, and among these are: New (never installed); Discovery (installed in an HVAC system, but still discovering other components); and Installed. When a controlled register 113-126 is installed on a duct, the controlled register 113-126 eventually detects air flow that is either hotter or colder than the ambient temperature in the region. The register controller notes the (relative) time (UT) that air flow starts and stops. The existence of hot or cold air passing through the register indicates that the controlled register has been installed in an HVAC system. At that time, the controlled register switches to discovery mode. The register controller sends out a request to the common address for all units within communication range to respond with their unique addresses. This request is accompanied by the newly installed register controller's own unique address. Alternatively the new unit may monitor all of the frequencies used by networks of registers, and if appropriate, attach a request to join at the end of the normal network transmission. In either case the unit only joins networks that appear to be on the same HVAC system. As noted, this may be accomplished by comparing the times that both nodes observed recent starts and stops of air flow. If these times are approximately equal, such as within about three seconds, the newly installed node joins the communications network of the discovered node, and the newly installed node changes its mode to "installed."

The network includes all the nodes that have set their states to indicate they are in the same network. The network may have an Identification Number that is arbitrary but unique. One way to guarantee uniqueness of the network ID is to use the unique address of any unit in the network, for example the first register controller in the network. This node is elsewhere called the "oldest" component and is the basis for network time, in that NT is identical to this node's UT.

A node may be removed from the network's list of nodes for any of several reasons. For example, if a node has not communicated with any node of the network for a substantial period of time, such as about a day, the network may mark the uncommunicative node as no longer a member of the network. This might happen if a register has been removed from the HVAC system. If any node of the network identifies itself as a member of another network, it is removed as a member of this network. If a register controller records the HVAC system's on and off times as substantially different from the consensus on-off times, the register controller is removed from the network.

If for any reason the "oldest" node is no longer a component of the network, it is possible that it will become the "oldest" component of a different network. To maintain uniqueness, the network changes its ID to the unique address of a different component, such as the numerically smallest ID among the remaining nodes. The offset for NT need not be changed, so that time may remain consistent within the network.

A controlled register 113-126 may also assume it has been installed when it detects a threshold level of air flow. Requiring detection of hot or cold air and an air flow may reduce false attempts to install. However, because false attempts to install do little harm, it is possible to attempt to install on air flow only. A controlled register 113-126 should not attempt to install itself until it has received a fairly full power supply charge and has detected a full system blower cycle of minimum duration (for example greater than one minute), so it can determine if it is in the same system as other units it discovers.

There are several methods of determining if two nodes are in the same system 100, but they all amount to discovering similarities in their respective environments. "Turn on" and "turn off" times for the air flow are good indicators for controlled registers 113-126. To identify a network thermostat 160-163, temperature fluctuations over time may be correlated, which should correlate best with a nearby controlled register 113-126. Once that register controller is identified, all other system nodes may be revealed by that register controller. In the case of a network thermostat 160-163, there may be a minimum correlation of temperature over time and a minimum signal strength for the communication link before the network thermostat is incorporated into the system 100. This acceptance threshold may be reduced over time, so the network thermostat 160-163 is eventually accepted, even if the correlation and the signal are weak. It may be assumed that the network thermostat 160-163 should be a part of some system and that a user would not put a network thermostat in a region with no controlled registers.

As an additional protection against installation mistakes, in one embodiment, register controllers 133-146 accept set point changes only from one network thermostat 160-163, and that network thermostat must be the one with the highest correlation of temperature fluctuations with the register controller. In addition, every change of set point may then be used to conduct an experiment to ensure that all register controllers are responding to the correct network thermostat, not a network thermostat in a nearby region.

For example, if the system is heating, and the local set point is reduced below the current region temperature (such as by a human adjusting the thermostat), all associated controlled registers may close their baffles to reduce air flow. This should result in a reduction in temperature, primarily in the region in which the network thermostat and its associated controlled register(s) are located. If there is a greater correlation with a different network thermostat or with a controlled register that is not associated with this network thermostat, the association may be incorrect and should be changed.

The "experiment" described above was initiated as a result of an action by a human. It is also possible for any node to initiate a similar experiment, absent action by a human. For example, if the temperature over time correlation is below a threshold, and there is a comparable correlation with other non-associated nodes, the node may automatically initiate the experiment.

Just as an automatically configuring network should be prepared to add new nodes, the network should also remove components that appear to have left the network. It is possible that a node has been removed by the owner to use on a different HVAC control system 100 that is within communication range. For example, the node may have been moved to another zone in the same building. Continuing to treat this component as a member of the old network could cause malfunction or suboptimal performance of the network. The HVAC control system 100 should periodically or occasionally compare HVAC on and off times and check other criteria, such as correlated temperature over time, to ensure that moved components are removed from the network.

A controlled register 113-126 can determine if it is sharing a region with another controlled register 113-126 by closing its damper and then monitoring the network to see if any other controlled register has had to open its damper to compensate. The experiment may also be run by opening the damper and seeing which controlled registers had to close its damper to compensate. Normally, the most effective technique (opening or closing) is the one that causes the greatest change in total air flow into or out of the region. In addition, duct pressure at the controlled register that initiated the experiment and all other registers can be measured and compared. Closing a supply register should increase the duct pressure at nearby supply registers, and opening a supply register should decrease the nearby supply register pressures. The results of these experiments can be combined with correlations of temperature and duct pressure.

Return Register

In conventional HVAC systems, the air flow is controlled only by air supply registers. The air return registers have no control baffle. In a conventional system, any attempt to control the air return registers would make balancing the system difficult.

In some embodiments of the present invention, a controllable air return register is used improve the system's ability to move air from areas that are too hot to where it is needed (or in the case of air conditioning, to move too cool air to where it is needed). With no control of the air returns, return air would come from all areas and tends to be the average air temperature in the building. This would limit the utility of simply moving air, without operating the heating/cooling device 103, to achieve comfort. In fact, if the system attempts to move the air from all over a building to a specific region, a greater portion of the returned air comes from that region, because the region with the open supply register tends to have a higher air pressure than other regions with closed supply registers. Consequently, little or no net change is made, and energy is wasted operating the blower 106.

In the case of heating, having controlled baffles on all of the returns allows the system to selectively move air from the hottest area to the coldest area. A secondary use for the controlled air return is to limit air movement from the rest of the building to regions that have been set back or turned off.

Although the controlled return registers 123-126 have hardware similar to the controlled supply registers 113-120, the control algorithm may be different. In some embodiments, the controlled return registers 123-126 have only two damper positions: open and closed.

The highest priority for a return register is to ensure it never fails in the closed state. Because most of the time the network controls temperature by adjusting the air supply registers, it is important that an inoperative controlled return register does not interfere with this process. To this end, the hardware should include a "default to open."

Remote Control Unit

The main function of the remote control units 150-153 is to allow a user to communicate with the network, such as to set a desired temperature within in specific region or to turn on or to turn off the supply of conditioned air to the region. However, the remote control units 150-153 do not act as central controls for the HVAC system. As noted, control of the HVAC system is distributed among at least the register controllers 133-146.

Each remote control unit 150-153 enables the user to: set a desired temperature within a specific region; program a temperature set-back schedule for each region; program set-backs based on other conditions, such as room occupancy; set the time and date in the network; turn the HVAC system on or off, in toto or in a selected region; override automatic installation parameters; display status information; display system performance data; display suggestions from the network for energy conservation or comfort improvement; and display error messages, such as messages related to dysfunctional components or inefficiencies.

Figure 8:
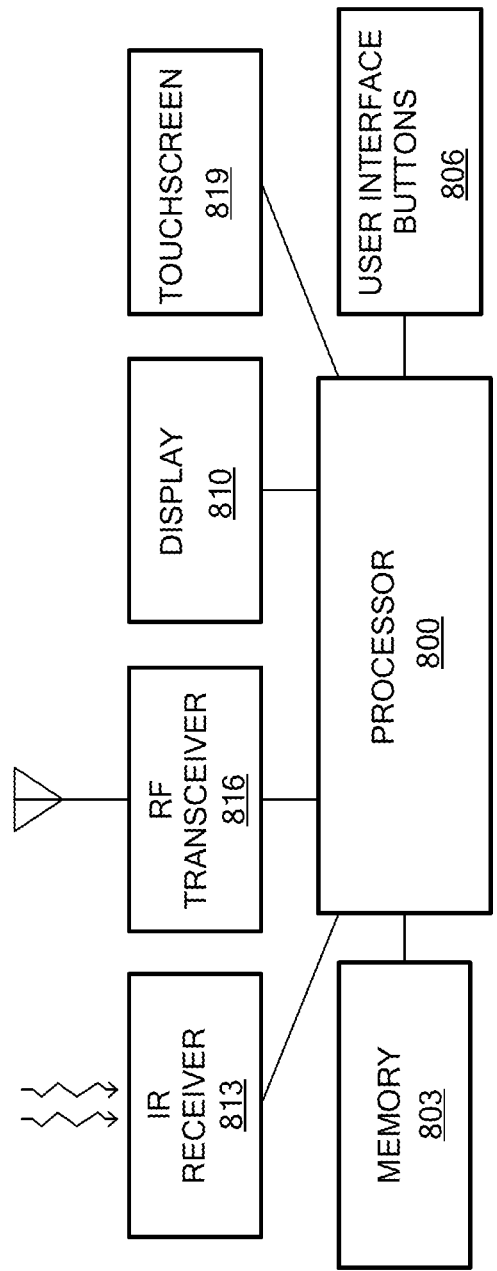
FIG. 8 is a schematic block diagram of an HVAC remote control unit of FIG. 1, according to an embodiment of the present invention.

FIG. 8 is a schematic block diagram of an exemplary remote control unit. A processor 800 executes instructions stored in a memory 803. According to the instructions, the processor accepts user inputs via a set of user interface buttons 806 and/or a touchscreen 819 and displays information on a display 810 or the touchscreen 819. The processor 800 communicates with a controller 613 (FIG. 6) in a nearby controlled register 113-120 via an infrared transceiver 813 and/or an RF transceiver 816. Thus, the user may use any remote control unit 150-153 to communicate with any controlled register 113-120 by aiming the infrared transceiver 813 at the infrared transceiver 606 (FIG. 6) of the controlled register 113-120.

Thermostat

Returning to FIG. 1, up to three types of thermostats may be used. The original HVAC system thermostat 108 may be retained to control the heating/cooling device 103 and blower 106. A network thermostat 163 that is connected to control the heating/cooling device 103 and the blower 106 may be connected to the original HVAC system thermostat 108, or the network thermostat 163 may replace the HVAC system thermostat 108. In either case, the network thermostat 163 includes a wireless transceiver, so it can communicate with other nodes of the network. A user may set a desired temperature, such as with conventional user interface buttons and a display on the network thermostat 163. The network thermostat 163 sends information about the user inputs, such as a desired temperature or set-back time, to the nodes of the network.

The third type of thermostat is a network thermostat 160 that is not connected to control the HVAC system. In other respects, the network thermostat 160 is similar to the network thermostat 163.

Network thermostats 160-163 may be added to any region. To ease installation, in some embodiments, network thermostats need no power connections. Each network thermostat 160-163 may have a photovoltaic cell on its front surface. The network thermostat may also have provision for a primary battery. While the network thermostat may have the same temperature measuring devices (thermistor and/or IR) as the register controllers, this is used primarily to determine which controlled registers are in the same region as the thermostat. Once installed in the network, the network thermostat may be completely turned off until the user pushes a button. In this case, the power to transmit the new setting to the network may be generated as the button is pressed, such as in a manner similar to that used for remote lighting controls. The thermostat may be thin enough to look like an electrical switch plate when it is glued to a wall.

As noted, a network thermostat 163 can replace the HVAC thermostat 108. To make the replacement of an existing thermostat simple, the network thermostat 163 allows for the connection to the wiring to be done arbitrarily. One embodiment of the network thermostat 163 has 7 input terminals, which provide a connector for every possible lead from the HVAC control 109. Once connected to the HVAC control 109, the network thermostat 163 measures voltage, resistance and/or impedances between pairs of connections. These pairs are either power supplies or windings on relays that control heating, cooling, and the blower. There are, at most, 6+5+4+3+2+1=21 such pairs. The power inputs should be obvious from the voltage across a pair. Pairs with a fairly low resistance are likely the windings of control relays in the HVAC control 109. The network thermostat may then determine which relays control the heating, cooling and blower by applying the HVAC supplied power to one or more of the relay leads and determining what happens, i.e., whether air flow begins, whether the flowing air is heated or cooled, etc. This mechanism not only makes the installation of the network thermostat easy, it also prevents user installation errors.

The network thermostat 160 is primarily a user interface allowing the user to observe the real temperature and the set point temperature, to adjust the set point temperature and to turn off the heating (cooling) to a region. As noted, the network thermostat 160 has local temperature measuring capability, but that is just reported to the network and does not directly adjust any register. For this reason, the network thermostat 160 only needs to be powered up for installation or after a button is pushed. A combination of a primary battery and power generated from pushing the button should allow a thermostat to install itself in a network and continue to perform its most important functions after the battery dies.

Temperature Control Algorithm

Figure 9:
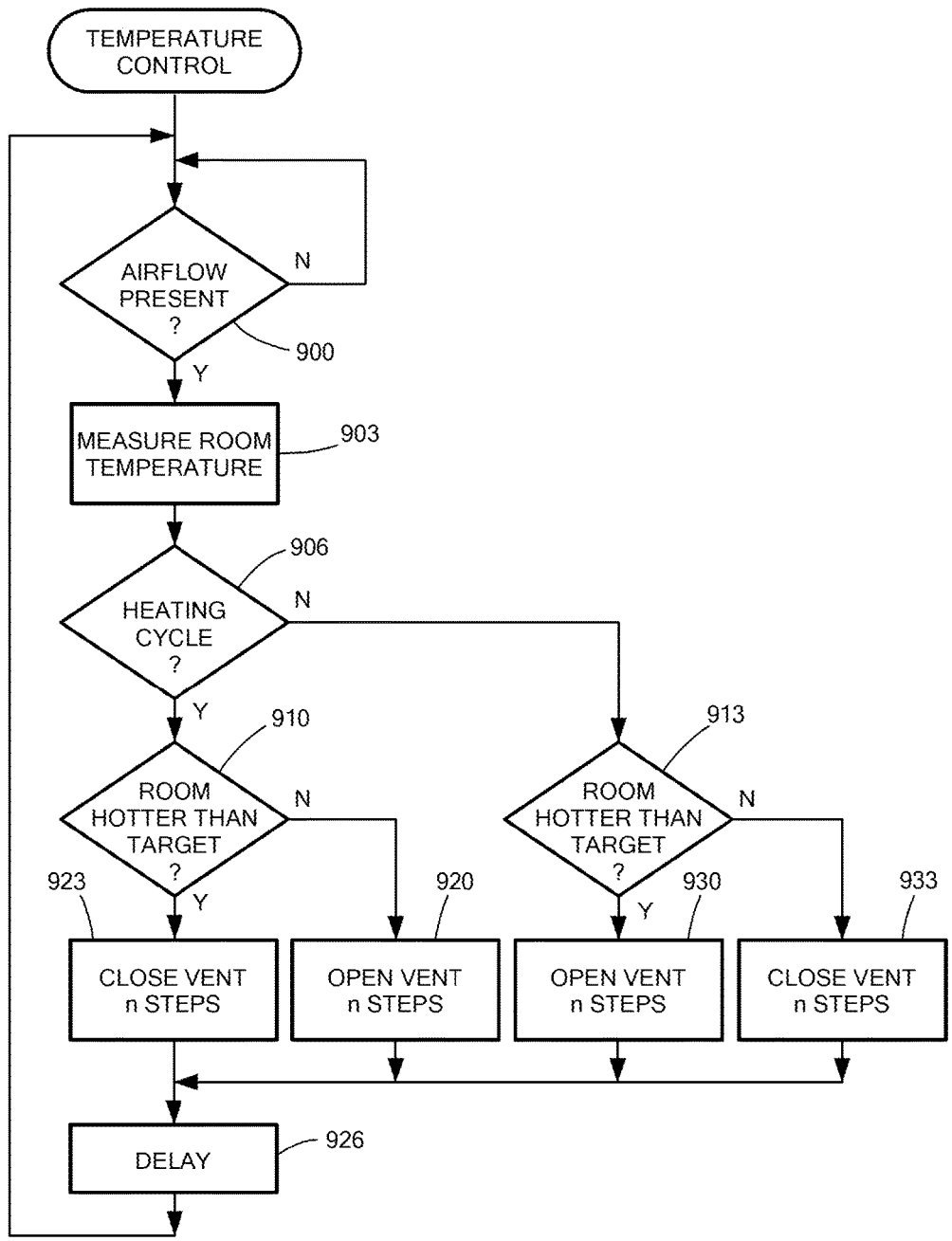
FIG. 9 is a flowchart illustrating a temperature control process, according to an embodiment of the present invention.

Each intelligent register controller 133-140 in a controlled supply register 113-120, and optionally each intelligent register controller 143-146 in a controlled return register 123-126, executes an algorithm that determines how and when the respective register's adjustable damper should be operated. In a system with generous power reserves available, the control algorithm can be quite simple, as illustrated by the flowchart of FIG. 9 For example, in heating mode, at 920, each register controller 133-146 opens its vanes when heat is supplied by the heating/cooling device 103 and blower 106, and at 923, the register controllers 133-146 close the vanes when their respective regions reach the desired temperatures. By closing the vanes most of the way in conventional, i.e., uncontrolled, registers 128 in the region containing the HVAC thermostat 108, the region serviced by the uncontrolled registers 128 heat more slowly than the regions supplied by the controlled registers 112-120. The heating device 103 shuts off when the HVAC thermostat 108 is satisfied. By that time, the regions supplied by the controlled registers 113-120 should have reached their respective target temperatures, and their respective register controllers 133-128 should have closed their adjustable dampers.

At 900, if air flow is detected, control passes to 903, where the room temperature is measured. If the HVAC system is operating in a heating mode, at 906 control passes to 910, otherwise control passes to 913. At 910, if the room is hotter than the target temperature for the room, control passes to 923, at which the vanes of the register are closed an incremental amount, such as a predetermined number of steps of a stepping motor. On the other hand, if at 910 the room is not hot enough, control passes to 920, where the register is opened an incremental amount. After a delay 926 to allow the room temperature to change in response to the increased or decreased airflow resulting from the incremental opening 920 or incremental closing 923 of the register, control returns to 900. Thus, as long as air is flowing through the register, the control loop repeated compares the room temperature to the desired room temperature and incrementally opens or closes the register, as needed. Optionally (not shown), if the room temperature is within a predetermined range of the desired temperature (i.e., within a "dead band"), the register opening may be left as it was in a previous iteration of the loop. Optionally (not shown), if the level of charge in the battery is below a predetermined threshold, the register opening may be left as it was in a previous iteration of the loop to conserve battery power that would otherwise be consumed operating the servo.

Similarly, if the HVAC system is operating in a cooling mode, at 913 the comparison between the current room temperature and the desired room temperature causes the register to be incrementally opened 930 or incrementally closed 933.

Figure 10:
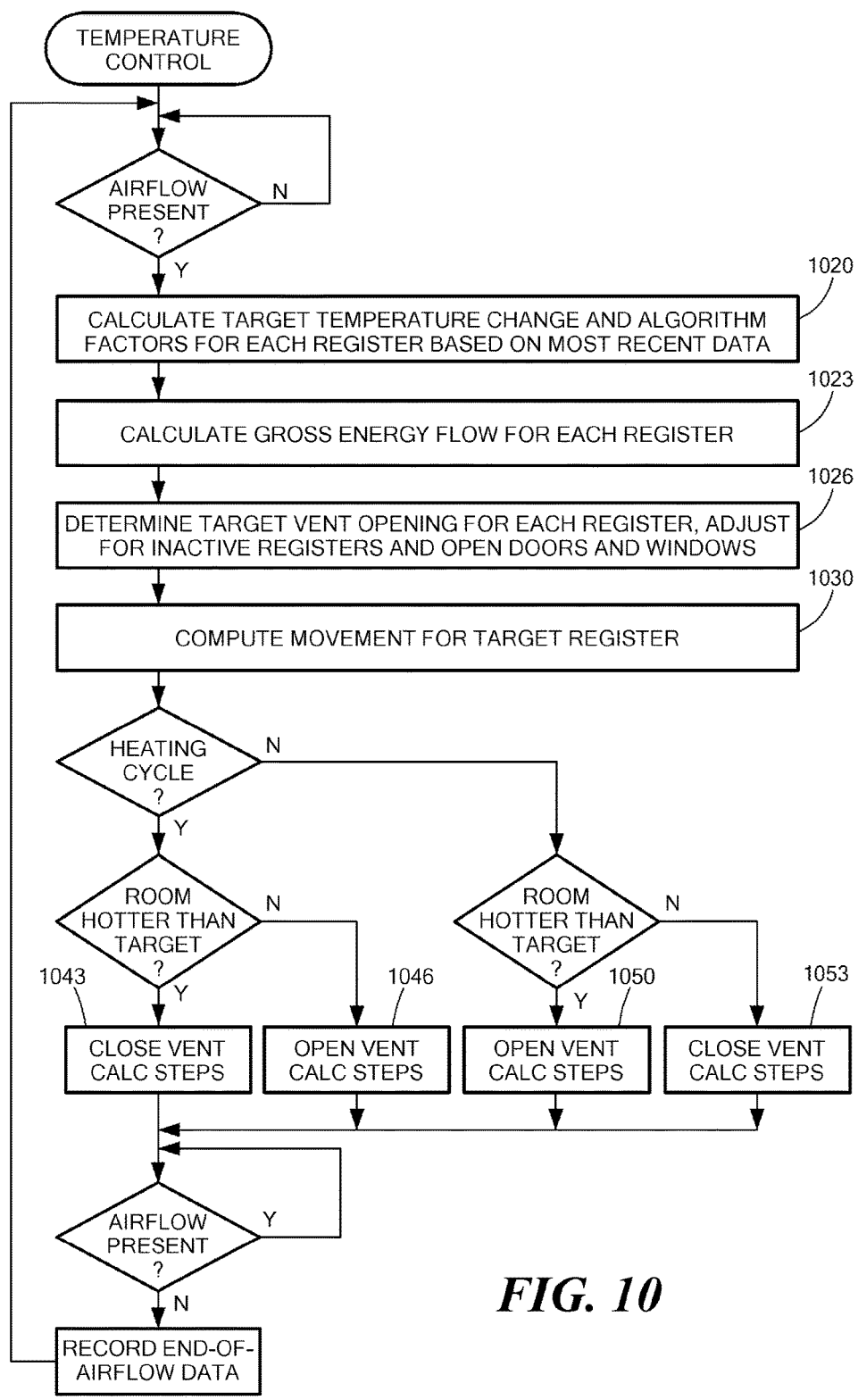
FIG. 10 is a flowchart illustrating another temperature control process, according to an embodiment of the present invention.

In another embodiment, the algorithm is more complex, as illustrated in the flowchart of FIG. 10 The vanes do not necessarily move continuously in reaction to real-time conditions. Instead, the vanes move only a step or two at a time in accordance with an algorithm that monitors system behavior over time and predicts the minimum needed adjustments, based on the energy requirements and physical characteristics of each region making up the entire system. In other words, the network collects data related to how much of a temperature change is caused by a certain change in openness of a register. For example, it may be experimentally determined that, for a given register, during a particular season of the year, a 10% change in the amount the register is open typically causes a 0.3° F. change in room temperature. Once this data has been collected, at 1026, the amount by which a register should be incrementally opened or closed may be calculated, based on the difference between the current room temperature and the desired room temperature. Then, at 1043, 1046, 1050 or 1053, the register may be opened or closed by the calculated incremental amount. Other aspects of the flowchart of FIG. 10 are similar to the flow chart of FIG. 9.

Each node of the network, or at least each register controller 133-140 in a controlled register, maintains a table (a Device Information Table (DIT)) of data for each other node in the network, or at least each register controller 133-140. Data in this table is used to maintain the communications network and to support the control algorithm. Most of this data is periodically or occasionally updated, such as every two minutes. A description of DIT entries and other data relevant to the control calculation is now provided.

Current Measured Temperature (Tpresent)—A best estimate of region temperature at the device. For a controlled register 113-126, the floor temperature is measured by a thermistor and the ceiling temperature is measured by a thermal IR detector, as previously discussed. The reported temperature is a weighted average from the two devices. Remote control units 150-153 and network thermostats 160-163 measure temperature with internal thermistors.

Target Temperature (Ttarget)—A temperature the controlled register 112-126 is attempting to achieve, if the device is in a constant temperature mode. On the other hand, if a schedule is active for the device, this value is ignored, and the target temperature set by the schedule is used.

Vent Position (controlled registers 112-126)—A percentage that the vents are currently open.

Heating Vent Gain (Fventgainh)—A factor used to determine the effectiveness of opening a vent a given amount. For example, this may be calculated as a rate of change in temperature a region might experience for a 25° C. outside temperature with the heating device 103 operating and all vents in the building open 50%.

Cooling Vent Gain (Fventgainc)—A factor used to determine the effectiveness of opening a vent a given amount. For example, this may be calculated as the rate of change in temperature a region might experience for a 25° C. outside temperature with the cooler 103 operating and all vents in the building open 50%.

Heating and Cooling Temperature Position Factor (Fposh and Fposc)—Regions near the outside of a building generally require energy inputs that are different than the inputs required by inside regions. These factors account for that difference.

Outside/Inside Air Temperature Factor (Foutin)—A factor based on the percentage of time that the heating/cooling device 103 has operated over the last 24-hour period, which is proportional to the difference in inside and outside temperatures. Blower 106 operation and temperature are both monitored to rule out "blower-only" time.

Daily Temperature Pattern (Fpattern)—A temperature profile over the course of a day typically follows pattern similar to previous days, and the maximum temperature typically occurs at about the same time from day to day. The algorithm may include a factor based on this pattern. For example, the algorithm may anticipate a need to provide more or less heating or cooling in the immediate or near future, based on this historical data. For example, the historical data may show that additional heating will likely be required beginning at about 5:00 PM, at least in certain rooms, such as because the sun ceases to shine at about that time on the part of the building where the rooms are located. Thus, the HVAC control system 100 may begin heating those rooms, beginning a little before 5:00 PM. Such anticipatory heating or cooling may even out the load on the heating/cooling device 103 (FIG. 1), thus reducing the capacity of the heating cooling device 103 required to meet instantaneous needs.

Power Available—A variable that gives an indication of the power available to a device. This may be an indication of the level to which the battery is charged. Any suitable range, such as integers from 0 to 10, may be used. For example, 0 and 1 may indicate the device does not have adequate power available to adjust its vents.

Dawn and Dusk Times—Each device utilizes its sensors to establish an estimate of dawn and dust times using two techniques. The first records the output of the photovoltaic cells to ascertain a pattern of sunrise and sunset, as described above. The second monitors the airflow pattern to determine when the peak heating or cooling times occur. (It may be assumed that the peak heating occurs at midnight, and the peak cooling occurs at noon.) Since each device has the data from all other devices, these numbers can be combined to make the best estimate of dawn and dusk. Because all devices execute the same algorithm and use the same data, all the devices arrive at the same values. Dawn and dusk time are used to time-calibrate a standard temperature pattern, described above.

As noted, the HVAC control system 100 includes no central controller. Each register controller 133-146 accumulates data from all other register controllers 133-146 in the system 100, and then each register controller 133-146 calculates its next action, taking into account the calculated actions of all of the other register controllers 133-146. These calculations occur periodically or occasionally, such as every two minutes during active airflow periods. The calculation results in a decision to open or close the vanes one or more steps or leave the vanes unchanged. The objective is to heat or cool all regions at the same rate of temperature change so, when the airflow ceases, each room will have achieved its target temperature. In systems 100 that include at least two intelligently controlled registers 113-126, barring any overriding temperature programming from any remote control unit 150-153 or network thermostat 160 or 163, i.e., absent an overt set point, the intelligent controlled registers 113-126 try to maintain the same temperature at all intelligent controlled registers 113-126. For example if the HVAC system 103 is heating, the cooler intelligent controlled registers 113-126 will increase their airflows. If the coolest intelligent controlled register 113-126 is all of the way open, warmer intelligent controlled registers 113-126 will decrease their airflows. If all the intelligent controlled registers 113-126 are in the network 100, all areas will reach the same temperature, and that temperature must be the temperature set by the HVAC systems thermostat 108. The decision to open or close an intelligent controlled register's 113-126 damper is made by that register. The basis for this decision comes from the information the intelligent controlled register 113-126 has received and saved from all other network components, as well as the register's own status and history. The algorithm proceeds as follows, as illustrated by the flowchart in FIG. 10. Heating or cooling versions of the factors are chosen to match the current mode of the system.

At 1020, for each controlled register 113-126, determine a target change in temperature to be achieved over the current airflow cycle. If a set-back, vacation or other schedule is active for the register, the target temperature is used from that source.

At 1023, for each controlled register 113-126, calculate a value proportional to the energy flow, such as according to equation (1).

$$\text{Energy flow contribution}(n) = (T\text{target} - T\text{present}) * F\text{ventgain} * F\text{pos} * F\text{outin} * F\text{pattern} \qquad (1)$$

At 1026, sum and normalize the values just calculated to determine the target vent openings required throughout the system 100. Compensate for any registers that may be stuck in position due to inadequate power reserves. Preferably, adjust the values so that at least one controlled supply register 113-120 will have it vents fully opened. This maximizes air flow and minimizes air leakage.

At 1030, from these results, determine the direction and rates the register vanes should be moved. Examine the time at which a movement last occurred to assess if a new movement is due. If so, execute that movement. As noted, if the current room temperature is within the dead band, or if the register's battery charge level is low, the register vanes may be left unchanged, at least for the current iteration through the control loop.

When air flow ceases, update the calculated values for each of the factors listed above, based on data from the air flow cycle.

Air Movement

Moving air from one region to another region, without operating the heating/cooling device 103, can save energy while increasing comfort, if several criteria are met. First, there should be a temperature difference between the two regions. Second, there should be at least two regions that are within their "dead bands," i.e., temperatures that are within a predetermined range, such as about three degrees, of their set points. However, at least one of the regions should be above its target temperature, and at least one of the regions should be below its target temperature. In addition, the region above its target temperature should be hotter than the region that is below its target temperature.

Each register controller 113-146 may have several goals, including: maintaining a desired temperature, minimizing energy consumption by the HVAC system and maintaining a minimum energy level in its power supply. If a minimum charge is maintained in its power supply, a register controller attempts to maintain the desired temperature range, and then to minimize energy consumption by the HVAC system.

If a register controller 113-146 is low on power, it reduces its power consumption by first increasing its dead band. If the power reserve continues to decline, at a predetermined point the register controller notifies the network of the problem and turns itself off. The register controller does not turn on again until a minimum power level (higher than the turn-off level) has been restored.

The main way an owner can help the system minimize HVAC energy consumption is to expand the dead band. The network has a dead band of temperatures in which an area is assumed to be comfortable. If the system is heating, and a controlled register is in a region that is below the dead band temperature range, the controlled register normally opens its damper until the region reaches minimum desired temperature. If the controlled register receives information over the network indicating that other regions failed to reach their desired temperatures, the controlled register temporarily expands its dead band, thereby permitting the temperature of its region to be lower or higher (depending on whether the HVAC system is heating or cooling) than the original set point. Intelligent controlled registers 113-126 have one of two types of set points: assumed or overt. An overt set point is a temperature target sent to a set of intelligent controlled registers 113-126 from the remote control unit 150-153 or from a network thermostat 160. Intelligent controlled registers 113-126 with overt set points attempt to maintain that temperature. On the other hand, an assumed set point is a temperature the intelligent controlled register 113-126 calculates on its own, such that all rooms fed by intelligent controlled registers 113-126 with assumed set points will be at a same temperature. Intelligent controlled registers 113-126 with assumed set points attempt to come to a common temperature. Once at least two intelligent controlled registers 113-126 are in a network, barring an overriding temperature programming from a remote source, such as a remote control unit 150-153, network thermostat 163, etc., i.e., the intelligent controlled registers 113-126 have assumed set points, the intelligent controlled registers 113-126 try to maintain equal temperatures at all the intelligent controlled registers 113-126. Thus, if heating and one intelligent controlled register 113-126 with an assumed set point reaches a temperature, cooler intelligent controlled registers 113-126 raise their assumed set points to match the achieved temperature. If the room/region with the HVAC thermostat 108 is fed by an intelligent controlled register 113-126 that has an assumed set point, the HVAC system 103 will not shut off until the room reaches the HVAC thermostat 108 set point, regardless of the assumed set point. However, until all the intelligent controlled registers 113-126 with assumed set points achieve the common temperature, warmer (assuming heating) registers, including the one in the room with the HVAC thermostat 108, will reduce their airflows, to the benefit of cooler registers. Therefore, logically, the HVAC thermostat 108 will not be satisfied until all intelligent controlled registers 113-126 with assumed set points have achieved a temperature equal to the HVAC thermostat 108 set point. Of course, once the HVAC system thermostat 108 is satisfied, it shuts off the HVAC system 103, but by that time, all rooms fed by intelligent controlled registers 113-126 with assumed set points have reached the temperature set on the HVAC thermostat 108. For example, if the HVAC system is heating, and the coolest controlled register is fully open but has failed to reach its minimum desired temperature, warmer controlled registers decrease their respective airflows, thereby making more air pressure and air flow available for the coolest controlled register. The goal of minimizing HVAC energy consumption causes the controlled register to close its damper by an amount that is a function of how far from the comfortable temperature the room air is, and how long it has been that way. If all of the registers in a system are in the same network, these register adjustments result in all regions coming to the same temperature, a temperature set by the HVAC system thermostat 108. This forms a basis for automatic network self-installation, without a need to connect to the HVAC system or replace and existing HVAC system thermostat. Attempting to balance the temperatures by first opening the coolest region's register (if the HVAC system is heating, or opening the warmest region's register if the HVAC system is cooling) ensures that all registers are as open as possible and still achieves a balance. This, in turn, ensures that the HVAC system has the least pressure in its ducts, thus minimizing energy waste in the HVAC blower and from duct leakage.

Figure 11:
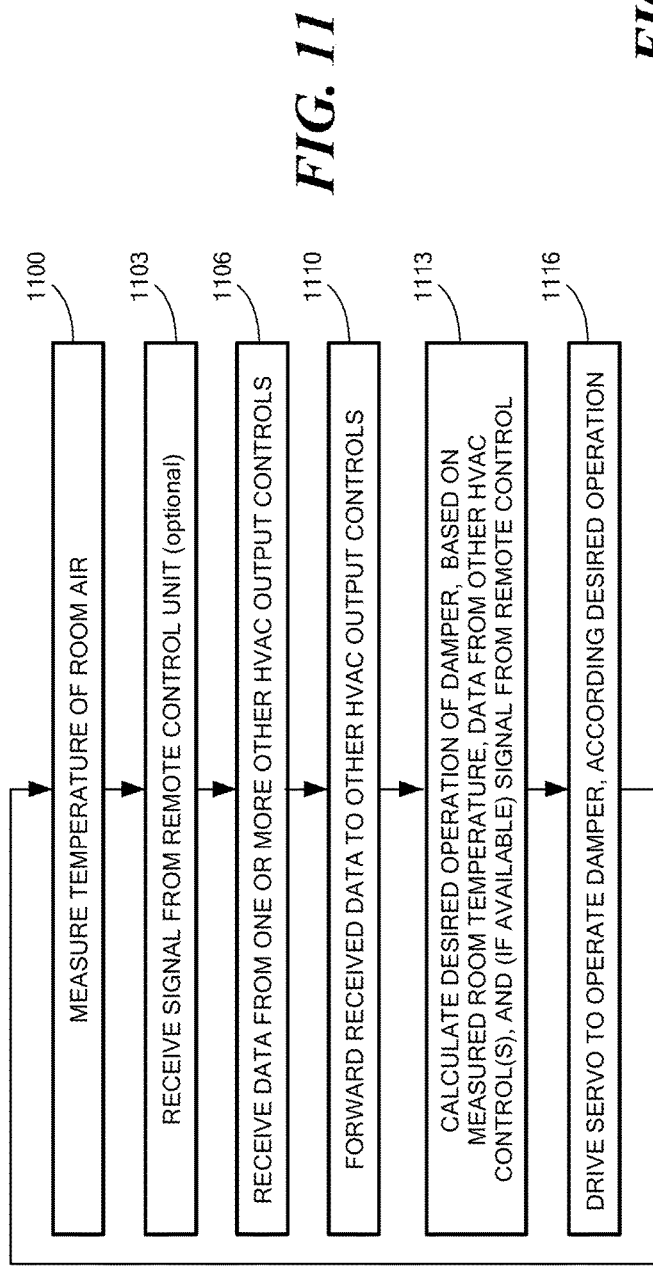
FIG. 11 is a flowchart illustrating operation of the controlled register of FIG. 2, according to an embodiment of the present invention

FIG. 11 is a flowchart illustrating operation of an intelligent controlled register 113-120. At 1100, air temperature of a region is measured. At 1103, optionally, a signal is received from a remote control unit. The signal may convey information about a desired set point temperature, set-back time, or the like. At 1106, signals are received from one or more first other intelligent controlled registers 113-120. The signals may convey information about measured air temperatures, desired set point temperatures, battery charge levels, air flow rates, damper states, and the like for the respective intelligent controlled register(s). At 1110, the information received from the other intelligent controlled register(s), along with corresponding information about this intelligent controlled register, is sent ("forwarded"), so that other intelligent controlled registers that are not within wireless communication range of the first other intelligent controlled registers may receive the information. That is, the information is distributed to other nodes of the network. At 1113, a desired damper operation is calculated, based at least in part on the available information about this and the other intelligent controlled registers of the network. The calculation may also involve information received from the remote control unit and/or a wireless thermostat. At 1116, a servo is driven to operate a damper, according to the calculated desired damper operation. Control then returns to 1100.

Network Communication

In normal operation, the devices in the HVAC control system 100 may be asleep between messages, and the amount of time that receivers are on is minimized. This is done to conserve the small amount of power (typically supplied by solar cells) that is available to each device. All of the devices in the network wake up in synchronization very briefly, such as at regular intervals, such as every two seconds, to see if a remote control is attempting to communicate. During one of these wake-up periods, at another interval, such as every two minutes, each of the devices in the system 100 passes a standard data messages in succession to all of the other devices. The standard data message may include current status and critical data for the device and additional information that is designed to optimize and maintain the integrity of the network. Each message contains an embedded device ID and a CRC message integrity check.

Each device maintains a Device Information Table (DIT). This table contains detailed information about all of the devices in the network. The DIT may be updated over the course of several message bursts. The data includes power stability and availability information for each device, as well as data on the reliability of reception of each device by the other devices. This allows a device to request forwarding channels to be set up, so that it may acquire data from devices it cannot directly receive from reliably.

Since all devices have data available from all other devices, and all devices run the same software, each individual device is able to compute the control decisions for the entire network and then locally apply the decisions that are applicable to itself. This is the key design element that allows the system 100 to operate without a central controller.

Exemplary numbers are given for the various timings of the system. Many of these values are defined by system settings in the software and are subject to change. The values given here are only exemplary; other values may be used, based on needs of the system, user preferences and other design considerations.

Figure 12:
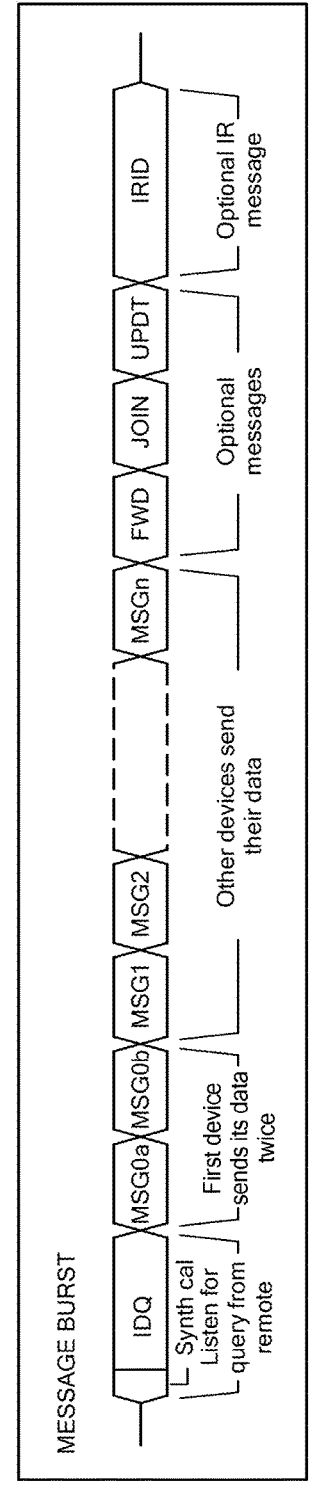
FIG. 12 is a schematic timing diagram of a communication protocol among the controlled registers of FIG. 1, according to an embodiment of the present invention.

Typically, after the system 100 has formed a working network, periodic or occasional communication burst are used. In one embodiment, every two minutes, all of the devices in the system 100 pass data between themselves in a burst of successive messages, as illustrated in FIG. 12. Portions of the message burst of FIG. 12 are now described.

IDQ—During this 10 mSec. time slot, each device calibrates an internal synthesizer, enables its receiver, and listens for an ID query command from the remote. The IDQ search occurs every 2 seconds. The remainder of the burst occurs only at the two-minute interval.

Dev 0—Dev n—This is the normal succession of transmissions by each member of the network. They start at predetermined times in 2 mSec. increments. If a device fails to transmit, the next device will still transmit at its allotted time. The first device transmits its data twice as part of the collision avoidance system, which is described below.

FWD—One or more packets may appear in this position for forwarded data. A forwarded data packet is identical to that originally sent by the device being forwarded. Forwarding is explained later in this document.

JOIN—New devices requesting membership in the network transmit a packet during this time. Joining the network follows a protocol described later in this document.

UPDT—A long block with software update data may be appended to the message stream at this position. Devices will only look for this block if the software update bit in the status byte of the previously received packet is set.

IRID—If the remote queried to identify a device during the IDQ period, all devices will respond with an ID message using the infrared (IR) link. If the remote query occurs at the time a message burst is scheduled, the IR response occurs at the end of the message burst as shown. Otherwise, the IR response occurs immediately after the query.

Figure 13A:
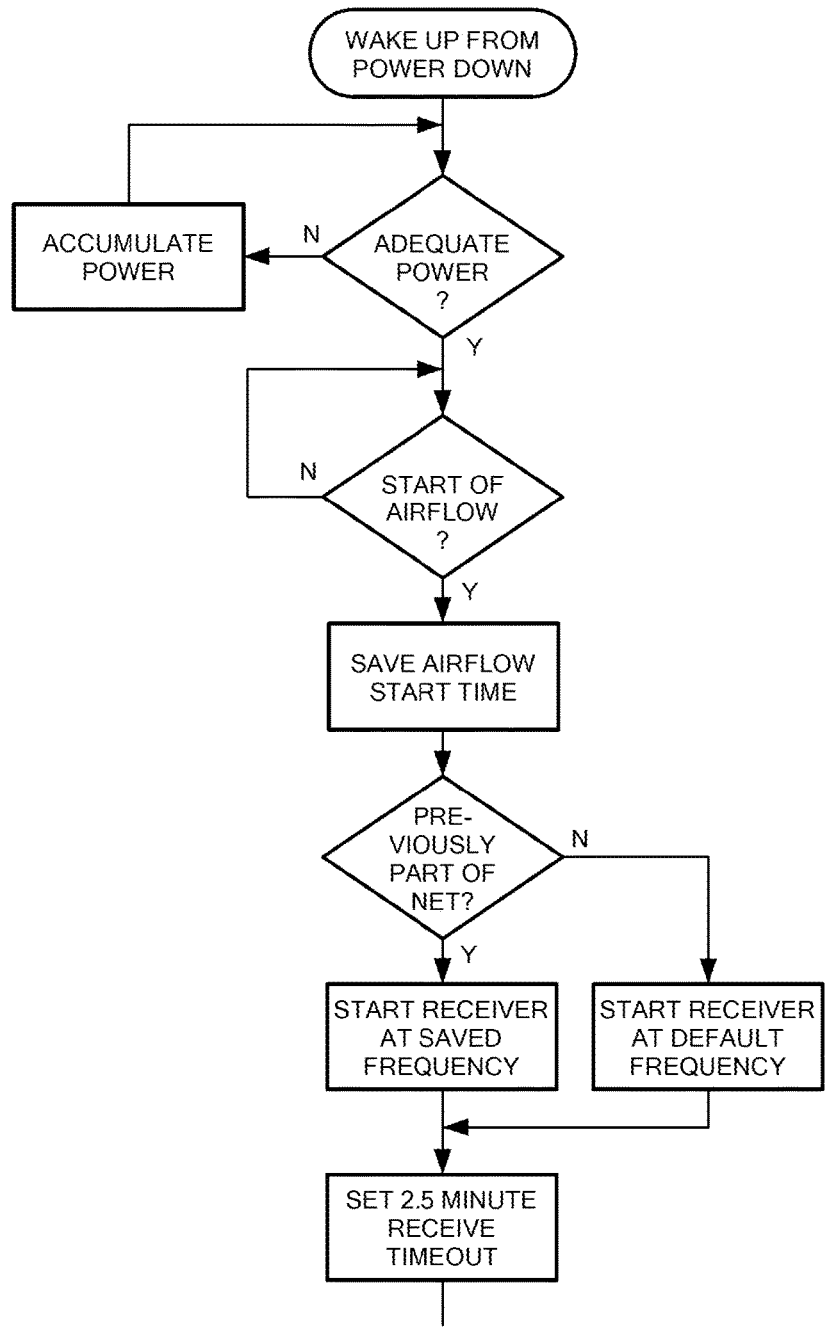
FIGS. 13A and 13B collective contain a flowchart illustrating operations performed by the controlled register of FIG. 2 upon first being installed or upon recovering from a power-down condition, according to an embodiment of the present invention.
Figure 13B:
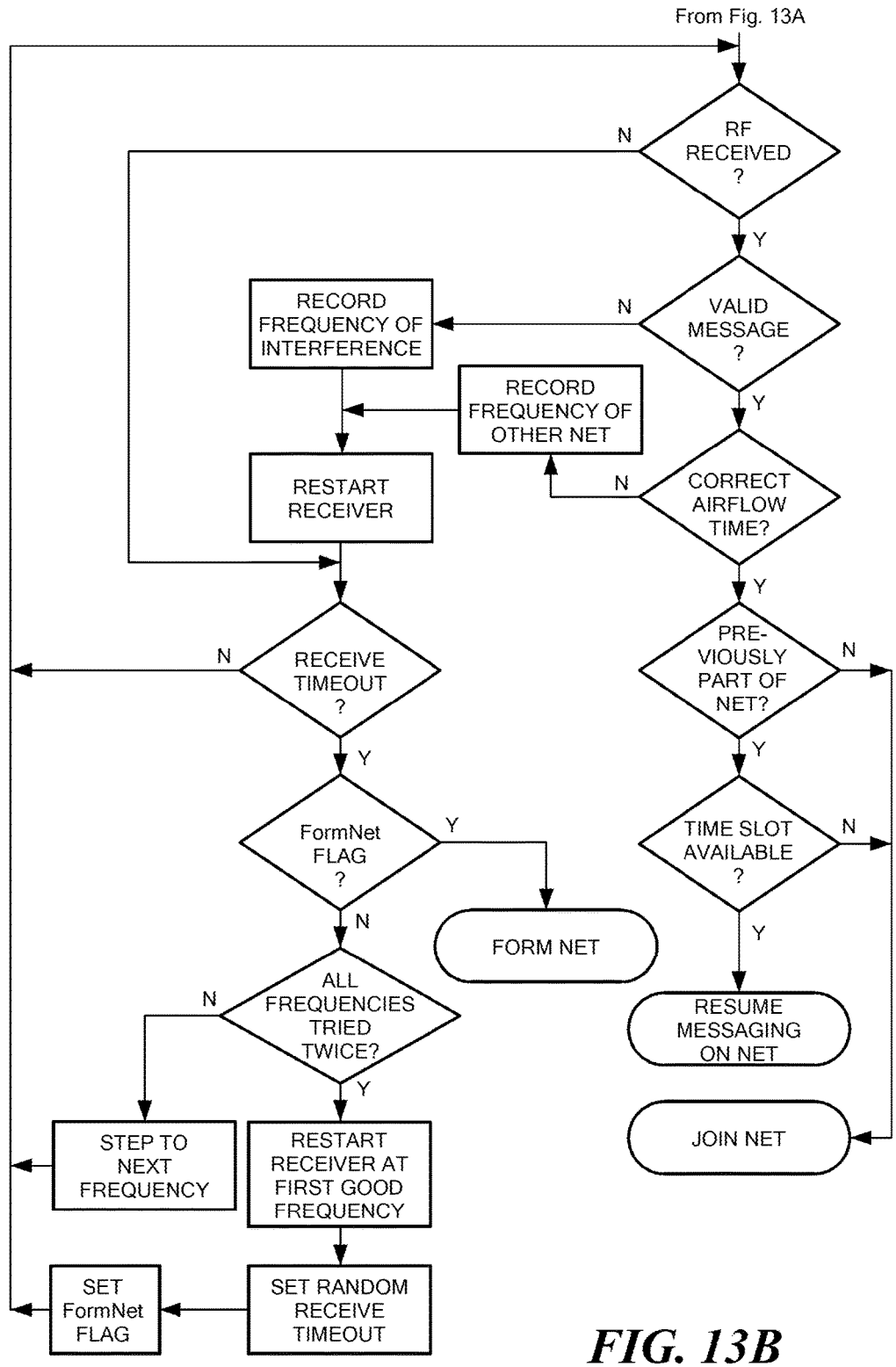

Devices in the system have very limited power available to them. When a new device is installed, it may have some power stored in rechargeable battery, or the battery might need to be charged before the newly-installed device can become a reliable member of the system 100. When a device "wakes up" for the first time, it assesses the power reserves available to it. It will not attempt to join or start a communications network until it determines that it has adequate power reserves to support reliable communication for twenty-four hours. Operations performed by a device upon waking, such as searching for a network to join, are illustrated in a flowchart in FIGS. 13A and 13B.

A device can stop functioning if it suffers a loss of power for a long extended period. As a result, it would have stopped communicating in a network it was previously part of while the device was out of commission, a number of events might have occurred. In most cases, the network would have resumed normal operation without the dropped member. RF interference may have caused the network to shift to an alternate frequency. Discovery of another network operating at the same frequency may have caused the network to change to another frequency. The device may have been taken out of the network and placed into another. All devices in the network may have dropped out. The device may be new and never have been part of a network before.

Once reliable power has been established, the device checks non-volatile memory to see if it was previously part of a network. If it was part of a network, it will look in non-volatile memory for the position it held in the message burst sequence and for the selected communication frequency and network ID.

In all cases, the device will then wait until its internal airflow sensor indicates that the HVAC fan has been activated. Once it sees airflow, it records the time at which the airflow started and enables its receiver. If it was previously part of a network, it will listen first at the memorized frequency. Otherwise, it will listen at the default frequency. It will listen at the starting frequency for 2.5 minutes. If a network is not found, it will shift to the next alternative frequency and make the same search. It will step through all of the frequencies twice in this manner. As it steps through the frequencies, the device will make a record of those frequencies that were clear of interference or other networks.

The receiver consumes significant power and, in most cases, cannot be run continuously. If the search for a network is unsuccessful, the receiver will be shut down and the search will be tried again at a later time determined by the available power.

If a network is found with the same airflow time, the search ends. A former member that has not lost its time slot merely resumes transmission. A new device or a former network member that has lost its time slot will enter the network joining process described below. A device that was part of a network previously but finds a different network ID may have been removed from one network and placed in another, but there is a small chance that it has discovered another network and that the furnaces came on at the same time. This case is handled by actions of the self-repair process described later in this document.

If a network is found with a different airflow start time, that network will be ignored and the search will resume when the channel is again clear.

If no network is found, a new device will attempt to establish one. To do this, it will restart its receiver at the lowest frequency that it has found to be clear of interference or other network traffic. It will then search at this frequency for a pseudo-random amount of time ranging form zero to 2.5 minutes. If no other device is found in that time, it will attempt to form a new network, as described in the following section.

The above discussion assumes that device has access to an airflow sensor, as do registers, main thermostats, and remotes docked to a thermostat back. Room thermostats and freestanding remotes do not have direct access to airflow sensors. These devices monitor temperatures over a length of time to correlate with changes in room temperature and thus calculate an equivalent airflow start time. If a remote is used to access a device that is connected to a network, it will obtain the network information from the device and join at that time.

Figure 14:
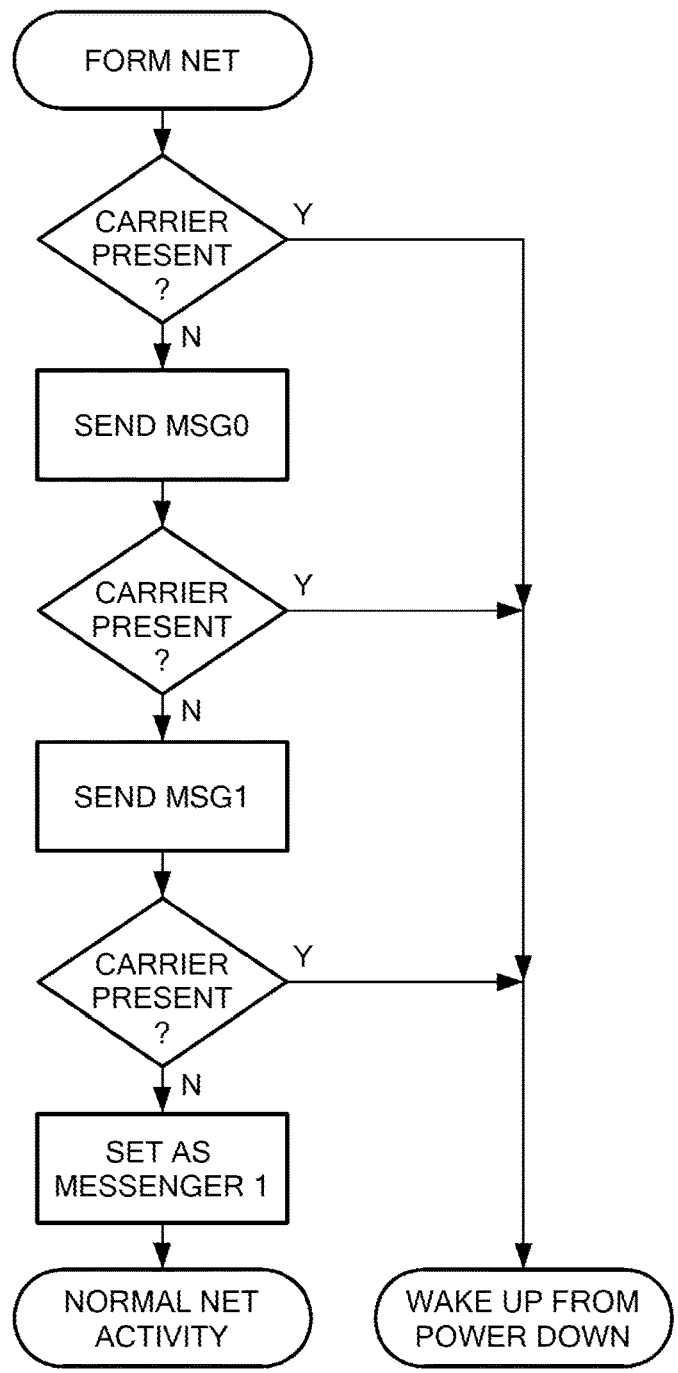
FIG. 14 is a flowchart illustrating operations performed by the intelligent controlled register of FIG. 2 for forming a network with other intelligent controlled registers, according to an embodiment of the present invention.

The process of network formation is illustrated by a flowchart in FIG. 14. The process is typically initiated by a register. All practical systems contain at least one register, and registers will also have the necessary access to airflow sensors.

To form the network, the device transmits the MSG0a, MSG0b sequence described above, looking for the presence of a carrier after each message. If no carrier is found, it assumes it is the first messenger on the network, and continues to transmit accordingly. Other devices will form around it according to the network joining process described below. If a carrier is found immediately after either MSG0a or MSG0b, it is assumed that another device is trying to send in the MSG0 position, and the device restarts the process of looking for an established network. The chances of such a collision are extremely small. The transmitter will only start if it sees a clear channel. The chance of two transmitters starting at the same time is about 5 μSec./2 minutes or one in 4.17E-8. The device established as the first messenger drops off the network and restarts the process if no other devices attempt to join within 24 hours.

Figure 15:
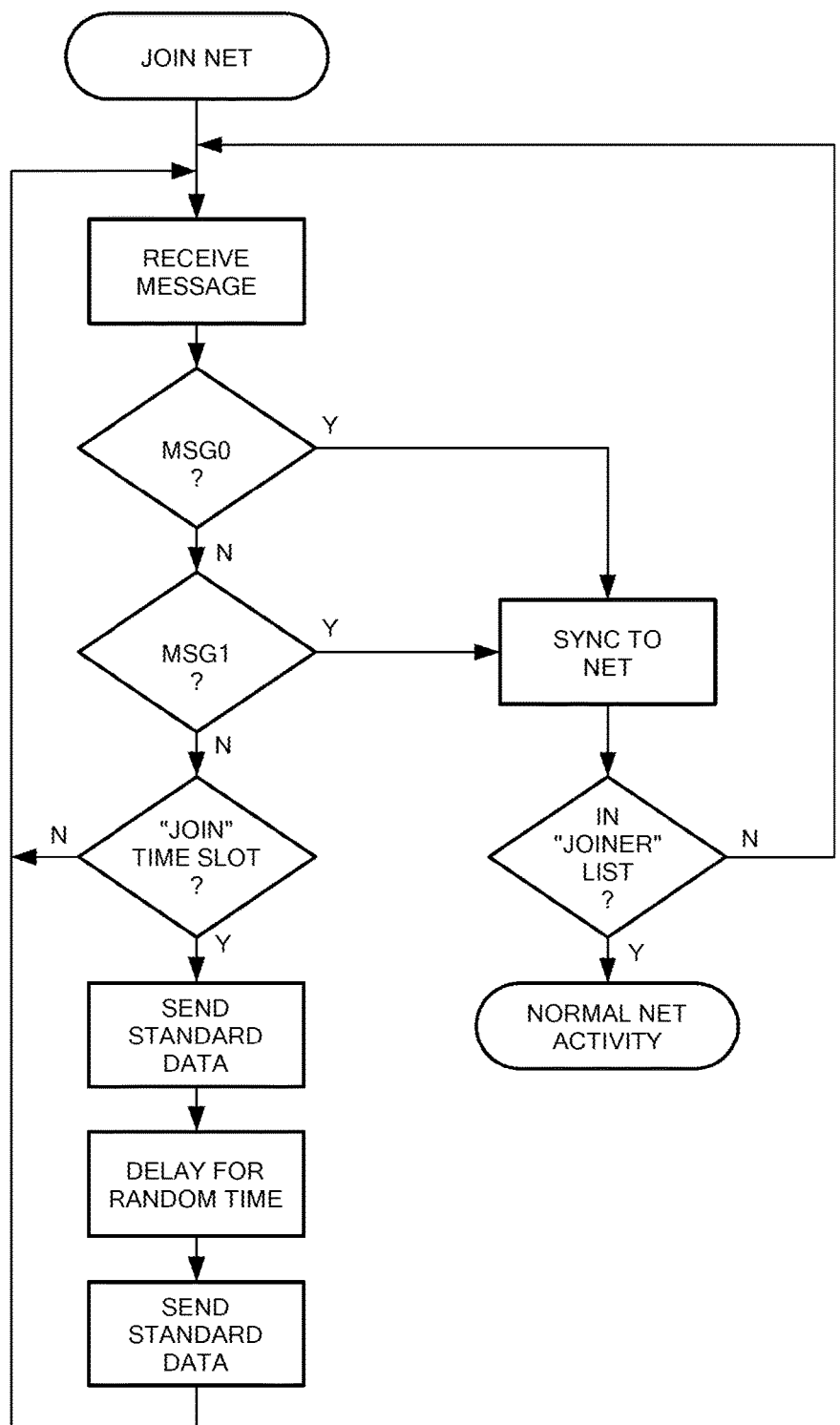
FIG. 15 is a flowchart illustrating operations performed by the intelligent controlled register of FIG. 2 for joining an existing network of other intelligent controlled registers, according to an embodiment of the present invention.

A device that desires to join the network typically first finds an existing network using the procedure detailed above and illustrated by a flowchart in FIG. 15.

It then sends a standard data message twice. The first is during the "join" time slot interval described above. The second is at time within the span of time that would be required for a message burst for a maximum sized system.

The time slot at which the device sends its message is determined by a pseudo-random number.

When the device that is the first messenger sees a message in the "join" time slot, it keeps its listening open for the remainder of the maximum sized message burst. If it sees one or more valid messages during that time it will, on the next burst, send Ids for the new devices seen in the cyclic data areas of MSG0a and MSG0b. It will also tell these devices their position in the message burst. After that point the new devices will begin to transmit in their allotted time slots. This process continues until all requesting devices have joined the network. Some collisions may occur during this time, but the devices will all be joined over a few cycles.

Each network member collects data from all of the other members. There may be physical problems, such as excessive distance or path obstructions, that prevent direct reception of a message from one member to another. To overcome this difficulty, a message forwarding system is implemented that operates as follows:

1—The data packet transmitted by each member contains three values that assist in the establishment of a forwarding link. These are the ID of the previous member and a rotating triplet consisting of the ID, receive signal strength, and power reliability index of each of the other members in the network.

2—Each member builds a Device Information Table (DIT) that contains a data block for each other network member consisting of ID, power reliability index, and receive signal strengths for all other members in the network.

3—The member that lacks data from another member analyzes the table to determine the best member to select as a forwarder for the missing data. Selection is based on the reliability of power and received signal quality from both the missing member and the requesting member. The requesting device then sends a request to the selected forwarder to regularly forward the missing data. This request is contained in the cyclic data section of the requesting member's standard data message.

The remote control 150-153 can be used in a variety of modes. In most systems, it is used to enter user preferences, such as temperature targets and schedules, into the system. To do this, the remote may be pointed at a device to send an RF query message to it and receives an IR response from it. This is called point-to-connect mode. The remote can also interact with devices remotely via RF, serving as an "armchair console" for the system. It can also be docked with a thermostat to act as the central furnace-controlling thermostat for the system.

When docked with a thermostat, the remote usually can receive power from the thermostat circuit. In this case, it connects to the system like other devices and communicates at the regular two-minute interval.

If not docked, the remote can operate in the same regular communication mode or, to conserve power and extend battery life, it can communicate at much longer intervals, dropping off the network and rejoining it as needed.

When operated in point-to-connect mode, the remote can access the device quickly in the following manner:

Point to Connect Device Acquisition—When the remote is commanded to connect to a device using the infrared (IR) link, the process is as follows:

1—If the remote has been actively communicating with the network, it will time the sending of the query message so as not to interfere. If not, it checks to see if RF traffic is present. If so, the remote will wait until the traffic stops, monitoring the message burst so that it will be synchronized to further traffic. It then sends an RF ID query message.

2—The remote waits for an immediate IR response if no RF traffic was present, or for a response at the end of the traffic. If a response is received, the remote proceeds with processing. If not, the remote repeats the enquiry until a response is received, or 2.5 seconds has elapsed. After each enquiry, the remote checks for RF traffic. If traffic is found, the remote records the time of the traffic and predicts the time of the next loop so that it can avoid future interference with the network. The IR message returned also includes the time of the next RF loop for the same purpose. The message also includes the device ID and, if established, network ID.

3—The responding device will now have "awakened" so that it continuously looks for additional addressed RF enquiries from the remote. These include requests to send data or settings information and downloads from the remote of updated information.

4—Once the remote has received the settings information from the device, it will use the variables table and main display screen corresponding to that device.

5—If a timeout period of no activity occurs, the device will return to normal operation.

Whenever the remote is on, it monitors the network, updating information from all other devices. A future remote screen will allow examination of the general health of the network.

The network is designed to be self-healing. Changes to the structure of the network follow the same general model as the method of establishing forwarding paths. Each device in the network is expected to act as a conscientious member. It is responsible for its own welfare, being sure it has adequate power before attempting transmissions or other actions. If it cannot hear one of the other members, it will ask another member to relay messages, but only after being sure the other member has adequate power reserves to handle such requests, and that the other member is also able to clearly hear the distant device. If a device determines that it will soon drop off the network due to a loss of power or other problem, it will inform the other members of the time when the drop-out will occur.

Interference and Changing Frequency—It is possible that two networks can be operating at the same frequency but not see each other because they have different start times. Eventually, as they drift due to slight differences in their crystal frequencies, they will collide. When this occurs, one or both networks will shift frequency.

Dropping a Device—A device will drop out if airflow times do not match (checked at time of second burst after airflow starts). Loss of power may cause a device to drop out. If so, it will notify the network in advance that it is about to leave.

Reassignment of Burst Position—Transmissions on the network are synchronized to the first device to send a message during each burst. The device performing that task is effectively the first device to ask for it when the network is formed. That device will continue to perform the task unless it develops a reliability problem that causes it to drop from the network. In that case, it will inform the network that it is dropping out. Another device will assume the "first messenger" role automatically based on the data in the DIT.

When devices receive an information update message, if devices in the system are discovered not to contain the most current code revision, the lowest ID numbered device with the most current code revision will broadcast a copy of the code. Those devices that are not current will update themselves, Normally, message bursts occur every two minutes, as described above. A demonstration mode can be entered via the remote. In this mode, the message burst occurs every two seconds. Demonstration mode may cause other operation changes within devices that vary according to the device type.

The standard device data packet is 48 bytes long, and takes 1536 μSec. to transmit at 250 Kbps. The remainder of the 2 mSec. time slot allows for RX/TX turnaround. An exemplary data packet is illustrated in FIG. 21.

Cyclic Data—Some data elements only need infrequent update. By not transmitting these every cycle, the average packet length can be reduced, reducing reception time, and thus, power requirements. The largest of these is a firmware update, which is sent and accumulated in small parcels that are stored in serial EEPROM by the receiving device for program update when the entire file is complete. Includes the following:
Network ID
Reception quality from all other devices
Power stability indicator
Time of last airflow
Software rev
Time clocks—UT,
Device ID—Each product contains a unique 32-bit device ID or serial number that is programmed in at manufacture. The three MSBs of the ID also indicates the type of device—0=register, 1=thermostat, 7=remote.
Error Checking—A 16-bit CRC is appended to all packets. Reception of a message that fails its CRC check causes that message to be discarded. The data update frequency is great enough that an occasional discarded packet causes no problems.

On query from the remote, the device sends settings information via a device settings data packet, an example of which is shown schematically in FIG. 22.

Short packets are sent by the remote to cause all devices to send their IDs via IR or other information via RF. These packets total 26 bytes in length, requiring 704 μSec. to transmit. An example of such a remote command packet is shown schematically in FIG. 23.

The remote standard update packet is 48 bytes long and is used to update standard information in a device after it has been edited by the remote. An example of such a remote standard update packet is shown schematically in FIG. 24.

The remote settings update packets is 48 bytes long and is used to update settings information in a device after it has been edited by the remote. An example of such a remote settings update packet is shown schematically in FIG. 25.

Each device maintains a table that records the most recent data transmitted by all devices in the system as well as some historical data. An example of such a device information table is shown schematically in FIG. 26.

Remote—The remote looks for the loop like any other device. An ID query RF message is queued for transmission. If a no-carrier space is found, the remote will send repeated queries, waiting each time for an IR response. If an RF carrier is found, a response will be looked for after the end of the loop.

Device—If an IR ID message request is received during the first interval, the response will be deferred until after the end of the chain. If a response is received when there is no following chain, the response will be sent immediately.

Remote—the remote looks for the loop like any other device. Once it finds the loop, it avoids direct communications during scheduled loop times. Otherwise, it will send messages anytime there is no carrier. If the remote transmits at the same time as the beginning of the loop, it will cause interference for that one time, but the system is designed to recover. Successive loops will not be interfered with.

The MSP processors used in the system may contain twice the memory needed to support their programs. Code updates write into alternate halves of the memory so that, if an update should fail, the device can continue to operate with the previous version of the code.

Figure 16:
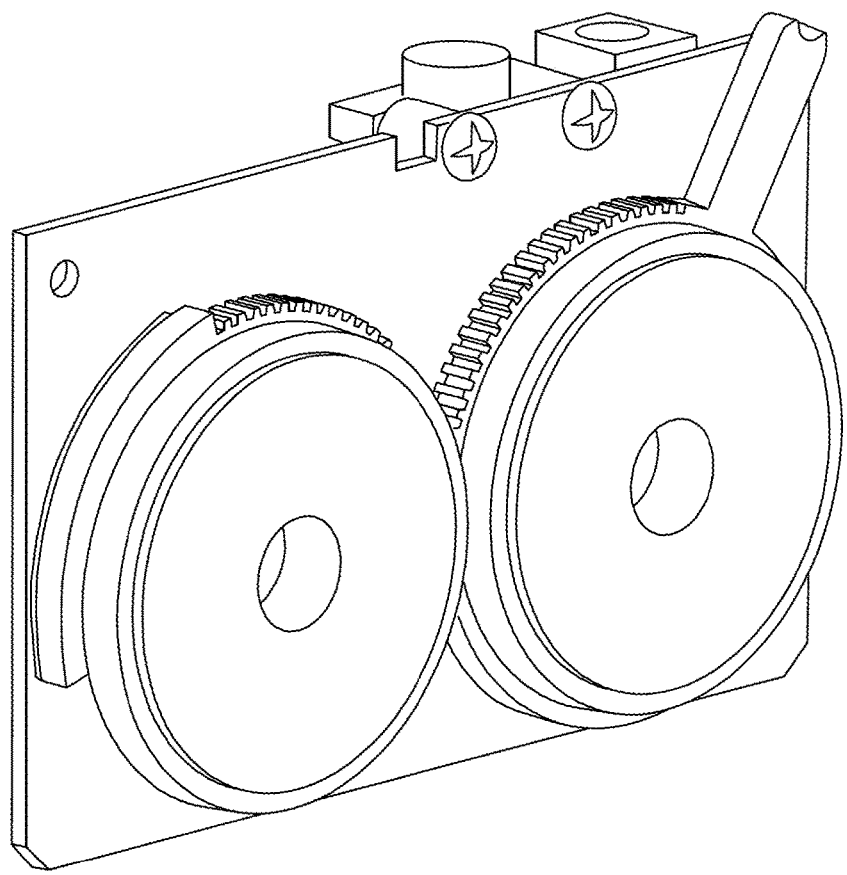
FIG. 16 is a perspective view of an integrated motor and sensor assembly, according to an embodiment of the present invention.
Figure 17:
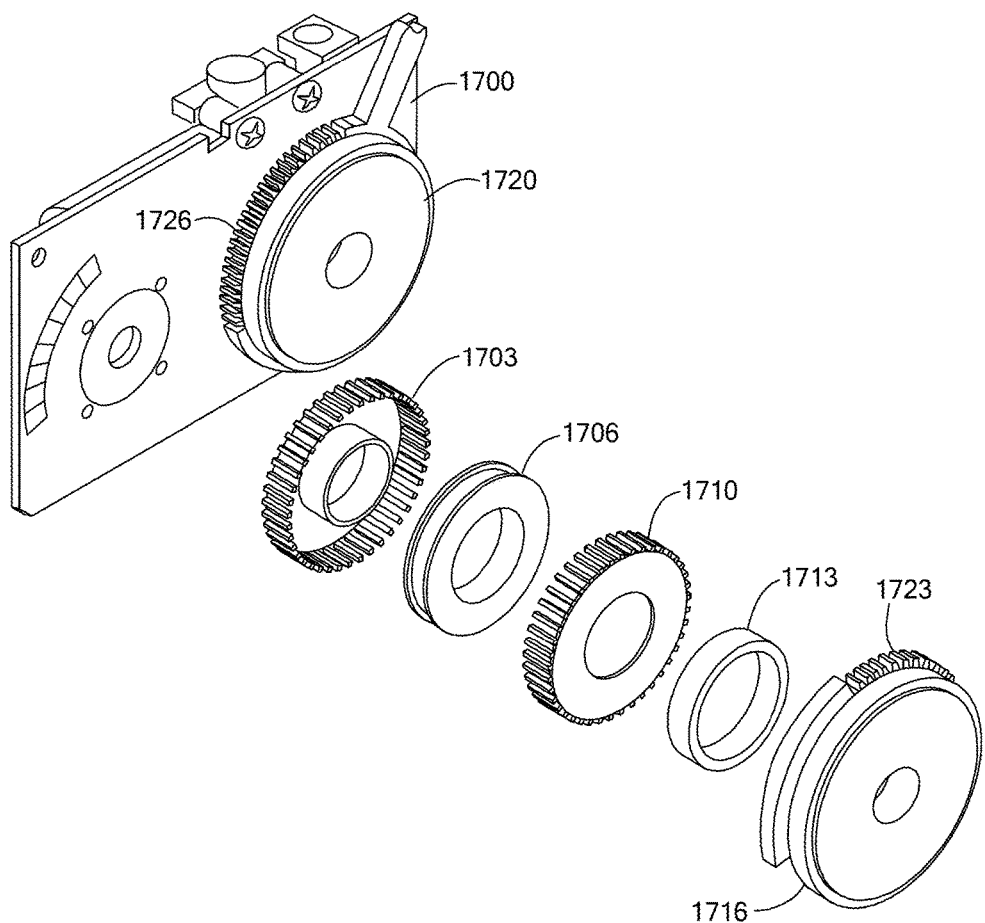
FIG. 17 is an exploded perspective view of the integrated motor and sensor assembly of FIG. 16.

A unique motor may be implemented as part of the design of an HVAC register, according to an embodiment of the present invention. The construction of one embodiment of such a motor is illustrated in FIGS. 16 and 17. This motor meets the following objectives:
Low Cost—in both components and labor
Integrated Detent—to maintain position when power is removed
High Power Efficiency—to allow it to be driven from a source of minimal power, such as an array of low-cost solar cells According to one embodiment, the motor is a 4-phase stepper motor. In this implementation, two stator stacks are formed as illustrated in FIG. 17, where the components of the left half of the motor have been shown in an exploded view. The first component to the right of the printed circuit board (PCB) 1700 is the bottom pole ring 1703. This is followed by a coil of wire 1706 wound on an insulating bobbin and then the top pole ring 1710. These components form one of the stators. The next component to the right is a rotor ring magnet 1713, which has been magnetized with alternating poles around its circumference at the same pitch as the two pole rings 1703 and 1710. The final component is the rotor housing 1716, to which the rotor magnet is permanently mounted. A similar second assembly 1720 mounts to the right to form a second stator and rotor. The two rotor housings include integrated gear features 1723 and 1726 that cause symmetrical counter-rotation of the two rotors with an offset of one pole position between the rotors. This causes the motor to act as a 4-phase stepper as the coils are energized in the conventional manner.

The cost savings of this motor over other forms that might be utilized are based on the following:
Stamped Pole Construction—The pole rings 1703 and 1710 are stamped form sheet metal material. This is an efficient and inexpensive manufacturing process.
Simple Coil—The coil 1706 design is the simplest of forms, reducing construction costs. Because the coil 1706 is mounted directly to the PCB 1700, no cost is incurred in the attachment of the lead wires needed with conventional motors.
Integration with PCB—The PCB 1700 is the mounting for the motor. The back of the bobbin has integrated clips which eliminate assembly screws, and plated holes in the PCB form the outer half of the bearings for the rotors.
Multiple use of Rotor Housings—The rotor housings are not only part of the motor, but form part of the position sensor described below, include the arm for manual adjustment of the register, and mount directly to the register vanes.

The pole segments of the motor are designed to cause deliberate detents. These are designed to hold the position of the vanes under airflow conditions even when power is removed from the motor.

High power efficiency is achieved partially through the absence of mechanical loss components such as gears and couplers. The motor is designed to have a large diameter to achieve high toque without the requirement of reduction gearing. The high ratio the motor diameter to the gap between the rotor and stator contributes to higher efficiency.

The external rotor design allows for a relatively large coil size, reducing electrical resistance losses.

Figure 18:
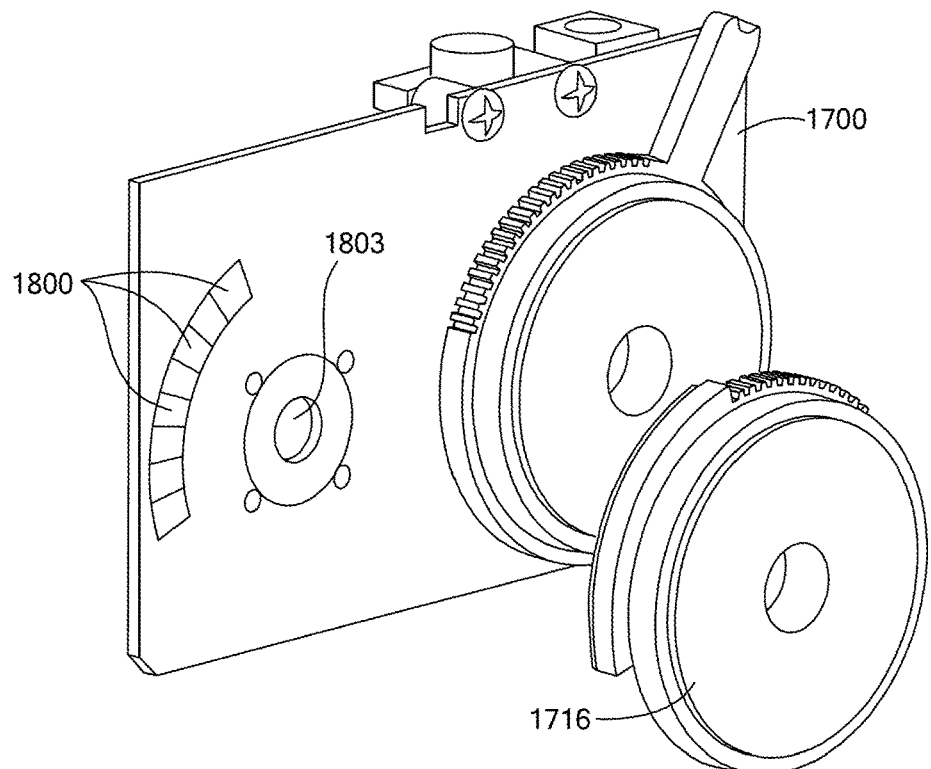
FIG. 18 is another exploded perspective view of the integrated motor and sensor assembly of FIG. 16, showing sensor pads, according to an embodiment of the present invention.
Figure 19:
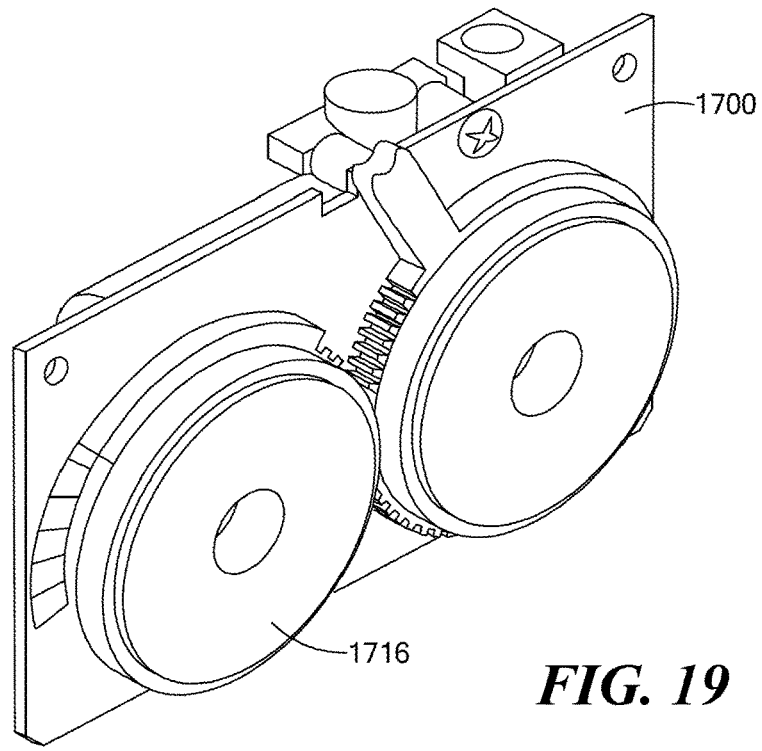
FIG. 19 is an exploded perspective view of the integrated motor and sensor assembly of FIG. 16, showing the sensor pads as the motor is rotated to a different position.

A sensor, illustrated in FIGS. 18 and 19, according to one embodiment of the present invention, is employed that is based on changes in electrical capacitance. The design is very low in cost, making use of the PCB 1700 and the rotor housing 1716 of one on the sections of the motor described above. The sensor operates in the following manner. Radial electrically conductive pads 1800 are disposed on the PCB 1700 around the center of a rotor hole 1803. Each of the radial pads 1800 around the circumference of the center of the rotor hole 1803 is sequentially electronically connected to a circuit that measures capacitance to ground or some other reference node. This capacitance is affected by the position of the rotor 1716, which is made of a metallic of metallically coated material. The body of the rotor is grounded through motor components. As the rotor rotates, one or more of the radial pads becomes partially or fully uncovered, changing capacitance to ground. The position of the rotor can thus be calculated from the measures capacitance values.

Application to Electrical Heating Systems

The HVAC control system 100 can be applied to heating systems incorporating an electric boiler or electric resistance baseboard heaters. A system using an electric boiler is really a hydronic system, as described above.

Figure 20:
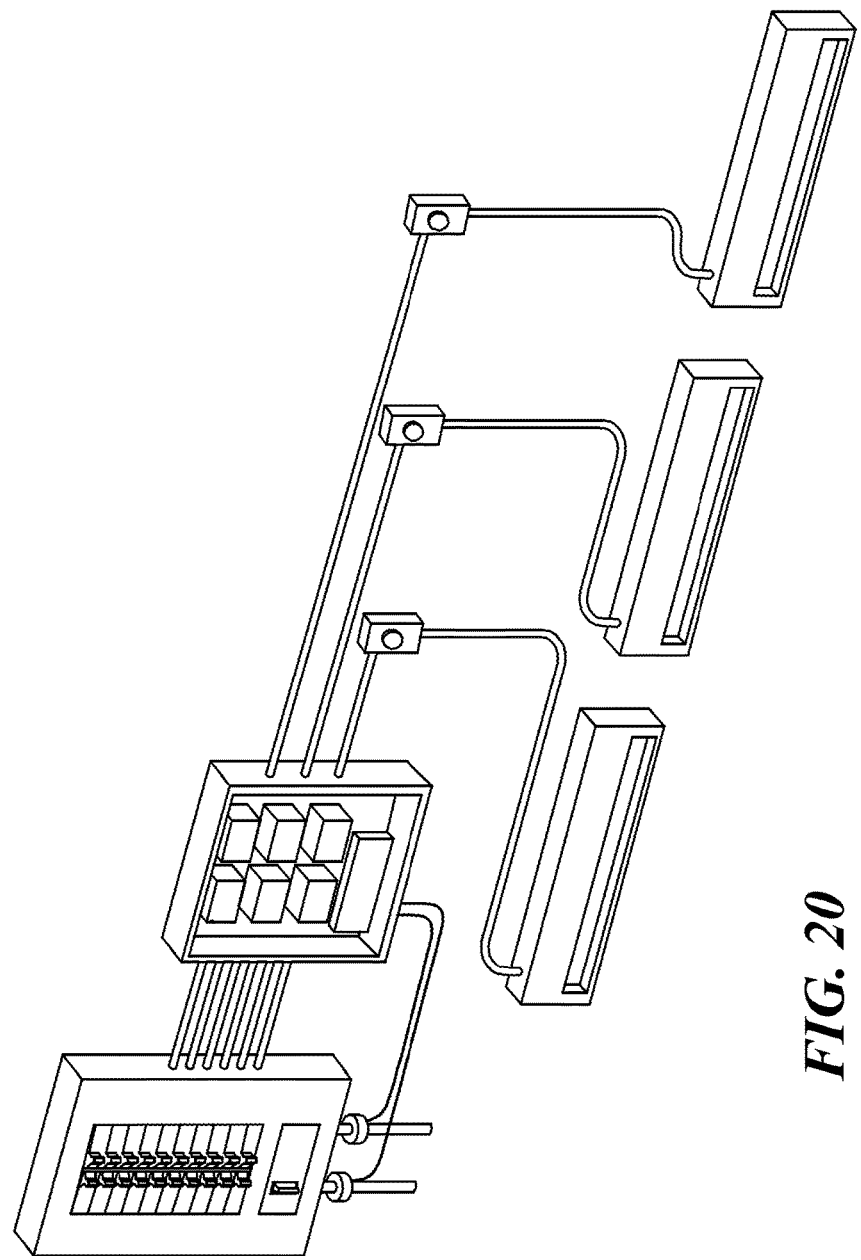
FIG. 20 is a schematic diagram of another HVAC system in which embodiments of the present invention may be practiced.

FIG. 20 shows a typical home heating system using baseboard electrical resistance heaters. Multiple heating circuits are routed from a central breaker box through a load controller. Each circuit is then routed via one or more electrical high-voltage thermostats to one or more baseboard heaters. Toroidal current transformers surround each of the main power wires entering the breaker box, and sensing wires from these transformers enter the load controller box. An electronic assembly in the load controller switches the heating circuits on and off to limit the maximum instantaneous load current drawn. This is done to minimize energy expense.

An HVAC control system for an electric heating system has the same features and advantages as an HVAC control system for a forced-air system, except for the redistribution of air. Combined systems can be implemented utilizing forced-air, hydronic and/or electric elements as needed.

An electric baseboard heating system using an HVAC control system as described herein may replace the standard electric thermostats with an electric thermostat. This device may utilize the control capabilities of a controllable register (as described above), but may control a relay(s) or triac(s) to control electric current to the heating element. Since the electric thermostat may be wall mounted, it may also contain the display and buttons of the standard wireless thermostat 160, described above with respect to FIG. 1. All elements of this system may communicate wirelessly (or optionally through wired connections) with other components, such as wall thermostats and remote controls in the same manner as in a forced-air system. One other component, a whole-house current sensor transceiver, may be added in an electric heating control system. This device utilizes the current sensors already connected to the load controller and taps into the signals inside the load controller box. Installation of this system is not a "drop-in," as described above for a forced-air system. It requires the low-level electrical work of replacing the electrical thermostats and adding the whole-house current sensor transceiver.

In accordance with an exemplary embodiment, systems and methods for controlling HVAC systems are provided. While specific values chosen for these embodiments are recited, it is to be understood that, within the scope of the invention, the values of all of parameters may vary over wide ranges to suit different applications.

An intelligent register controller has been described as including a processor controlled by instructions stored in a memory. The memory may be random access memory (RAM), read-only memory (ROM), flash memory or any other memory, or combination thereof, suitable for storing control software or other instructions and data. Some of the functions performed by the intelligent register controller have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of a system for controlling an HVAC system have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiment(s).

What is claimed is:

1. A method for operating an intelligent controlled HVAC vent of a plurality of intelligent controlled HVAC vents, at least one intelligent controlled HVAC vent of the plurality of intelligent controlled HVAC vents operating without an externally set temperature goal, the method comprising, at each intelligent controlled HVAC vent that has no externally set temperature goal:

measuring a temperature of a location fed by the intelligent controlled HVAC vent that has no externally set temperature goal;

automatically wirelessly coordinating among all intelligent controlled HVAC vents of the plurality of intelligent controlled HVAC vents that have no externally set temperature goals, with an aim toward achieving equal temperatures at all locations fed by the intelligent controlled HVAC vents that have no externally set temperature goals;

ascertaining an extent to which the intelligent controlled HVAC vent that has no externally set temperature goal is open;

wirelessly receiving first information indicating, respectively, an extent to which each other intelligent controlled HVAC vent is open; and automatically adjusting the extent to which the intelligent controlled HVAC vent that has no externally set temperature goal is open, such that when a comparable adjustment is made by all intelligent controlled HVAC vents of the plurality of intelligent controlled HVAC vents, at least one intelligent controlled HVAC vents of the plurality of intelligent controlled HVAC vents is fully open.

2. The method according to claim 1, further comprising:

wirelessly receiving second information indicating a respective temperature of a respective location fed by each other intelligent controlled HVAC vent that has no externally set temperature goal; and automatically recalculating the extent to which the intelligent controlled HVAC vent that has no externally set temperature goal should be open, based on the temperatures of locations fed by each of the other intelligent controlled HVAC vents that have no externally set temperature goals.

3. The method according to claim 2, wherein automatically recalculating the extent to which the intelligent controlled HVAC vent that has no externally set temperature goal should be open comprises:

comparing the temperature of the location fed by the intelligent controlled HVAC vent that has no externally set temperature goal to the second information; and if a result of the comparing indicates the temperature of the location fed by the intelligent controlled HVAC vent that has no externally set temperature goal is less than a temperature of at least one location fed by another intelligent controlled HVAC vent that has no externally set temperature goal, automatically increasing airflow through the intelligent controlled HVAC vent.

4. The method according to claim 3, wherein automatically increasing the airflow comprises:

ascertaining whether a damper of the location fed by the intelligent controlled HVAC vent that has no externally set temperature goal is fully open; and if the damper is ascertained to be not fully open, automatically fully opening the damper.

5. The method according to claim 2, wherein automatically recalculating the extent to which the intelligent controlled HVAC vent that has no externally set temperature goal should be open comprises:

comparing the temperature of the location fed by the intelligent controlled HVAC vent a has no externally set temperature goal to the second information; and if a result of the comparing indicates the temperature of the location fed by the intelligent controlled HVAC vent that has no externally set temperature goal is greater than a temperature of at least one location fed by another intelligent controlled HVAC vent that has no externally set temperature goal, automatically increasing airflow through the intelligent controlled HVAC vent that has no externally set temperature goal.

6. The method according to claim 5, wherein automatically increasing the airflow comprises:

ascertaining whether a damper of the location fed by the intelligent controlled HVAC vent that has no externally set temperature goal is fully open; and if the damper is ascertained to be not fully open, automatically fully opening the damper.

7. The method according to claim 2, wherein automatically recalculating the extent to which the intelligent controlled HVAC vent that has no externally set temperature goal should be open comprises:

comparing the temperature of the location fed by the intelligent controlled HVAC vent that has no externally set temperature goal to temperatures of locations fed by other intelligent controlled HVAC vents that have no externally set temperature goals; and if a result of the comparing indicates the temperature of the location fed by the intelligent controlled HVAC vent that has no externally set temperature goal is greater than a temperature of at least one of the locations fed by the other intelligent controlled HVAC vents that have no externally set temperature goals, automatically decreasing airflow through the intelligent controlled HVAC vent that has no externally set temperature goal.

8. The method according to claim 2, wherein automatically recalculating the extent to which the intelligent controlled HVAC vent that has no externally set temperature goal should be open comprises:

comparing the temperature of the location fed by the intelligent controlled HVAC vent that has no externally set temperature goal to temperatures of locations fed by other intelligent controlled HVAC vents that have no externally set temperature goals; and if a result of the comparing indicates the temperature of the location fed by the intelligent controlled HVAC vent that has no externally set temperature goal is less than a temperature of at least one of the locations fed by the other intelligent controlled HVAC vents that have no externally set temperature goals, automatically decreasing airflow through the intelligent controlled HVAC vent that has no externally set temperature goal.

9. The method according to claim 2, wherein automatically recalculating the extent to which the intelligent controlled HVAC vent that has no externally set temperature goal should be open comprises:

comparing temperatures of all locations fed by intelligent controlled HVAC vents that have no externally set temperature goals to ascertain which intelligent controlled HVAC vent that has no externally set temperature goal has a lowest temperature;

comparing the temperature of the location fed by the intelligent controlled HVAC vent that has no externally set temperature goal to the lowest temperature;

using the first information to ascertain whether the intelligent controlled HVAC vent that that has no externally set temperature goal and the lowest temperature is fully open; and if a result of the comparings indicates (a) the intelligent controlled HVAC vent that has no externally set temperature goal and the lowest temperature is fully open and (b) the temperature of the location fed by the intelligent controlled HVAC vent that has no externally set temperature goal is greater than the lowest temperature, automatically decreasing airflow through the intelligent controlled HVAC vent that has no externally set temperature goal.

10. The method according to claim 9, wherein automatically decreasing the airflow comprises:
calculating a difference between the temperature of the location fed by the intelligent controlled HVAC vent that has no externally set temperature goal and a target temperature; and
automatically closing a damper of the intelligent controlled HVAC vent that has no externally set temperature goal by an amount that is a function of the difference.

11. The method according to claim 10, wherein automatically decreasing the airflow further comprises:
calculating a duration the difference has existed; and
automatically closing the damper by an amount that is a function of the difference and the duration.

12. The method according to claim 2, wherein automatically recalculating the extent to which the intelligent controlled HVAC vent that has no externally set temperature goal should be open comprises:
comparing temperatures of all locations fed by intelligent controlled HVAC vents that have no externally set temperature goals to ascertain which intelligent controlled HVAC vent that has no externally set temperature goal has a highest temperature;
comparing the temperature of the location fed by the intelligent controlled HVAC vent that has no externally set temperature goal to the highest temperature;
using the first information to ascertain whether the intelligent controlled HVAC vent that has no externally set temperature goal and the highest temperature is fully open; and
if a result of the comparings indicates (a) the intelligent controlled HVAC vent that has no externally set temperature goal and the highest temperature is fully open and (b) the temperature of the location fed by the intelligent controlled HVAC vent that has no externally set temperature goal is less than the highest temperature, automatically decreasing airflow through the intelligent controlled HVAC vent.

13. The method according to claim 12, wherein automatically decreasing the airflow comprises:
calculating a difference between the temperature of the location fed by the intelligent controlled HVAC vent that has no externally set temperature goal and a target temperature; and
automatically closing a damper of the intelligent controlled HVAC vent that has no externally set temperature goal by an amount that is a function of the difference.

14. The method according to claim 13, wherein automatically decreasing the airflow further comprises:
calculating a duration the difference has existed; and
automatically closing the damper by an amount that is a function of the difference and the duration.

15. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
ascertaining whether the intelligent controlled HVAC vent that has no externally set temperature goal is fully open;
wirelessly receiving second information indicating a respective temperature of a respective location fed by each other intelligent controlled HVAC vent that has no externally set temperature goal;
second comparing the temperature of the location fed by the intelligent controlled HVAC vent that has no externally set temperature goal to the second information; and
if (a) a result of the first comparing indicates the temperature of the location fed by the intelligent controlled HVAC vent that has no externally set temperature goal is outside the dead band and (b) the intelligent controlled HVAC vent that has no externally set temperature goal is ascertained to be not fully open and (c) a result of the second comparing indicates the temperature of the location fed by the intelligent controlled HVAC vent that has no externally set temperature goal is less than the temperature of any location fed by another intelligent controlled HVAC vent that has no externally set temperature goal, increasing the extent to which the intelligent controlled HVAC vent that has no externally set temperature goal is open.

16. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
ascertaining whether the intelligent controlled HVAC vent that has no externally set temperature goal is fully open;
wirelessly receiving second information indicating a respective temperature of a respective location fed by each other intelligent controlled HVAC vent that has no externally set temperature goal;
second comparing the temperature of the location fed by the intelligent controlled HVAC vent that has no externally set temperature goal to the second information; and
if (a) a result of the first comparing indicates the temperature of the location fed by the intelligent controlled HVAC vent that has no externally set temperature goal is outside the dead band and (b) the intelligent controlled HVAC vent that has no externally set temperature goal is ascertained to be not fully open and (c) a result of the second comparing indicates the temperature of the location fed by the intelligent controlled HVAC vent that has no externally set temperature goal is greater than the temperature of any location fed by another intelligent controlled HVAC vent that has no externally set temperature goal, increasing the extent to which the intelligent controlled HVAC vent is open that has no externally set temperature goal.

17. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
wirelessly receiving second information indicating a respective temperature of a respective location fed by each other intelligent controlled HVAC vent that has no externally set temperature goal;
second comparing the temperature of the location fed by the intelligent controlled HVAC that as no externally set temperature goal vent to the second information;
ascertaining whether at least one other intelligent controlled HVAC vent that has no externally set temperature goal is fully open;
if (a) a result of the first comparing indicates the temperature of the location fed by the intelligent controlled HVAC vent that has no externally set temperature goal is outside the dead band and (b) a result of the second comparing indicates the temperature of the location fed by the intelligent controlled HVAC vent that has no externally set temperature goal is greater than temperatures of all locations fed by other intelligent controlled HVAC vents that have no externally set temperature goals and (c) at least one other intelligent controlled HVAC vent that has no externally set temperature goal is ascertained to be fully open, decreasing the extent to which the intelligent controlled HVAC vent that has no externally set temperature goal is open.

18. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
wirelessly receiving second information indicating a respective temperature of a respective location fed by each other intelligent controlled HVAC vent that has no externally set temperature goal;
second comparing the temperature of the location fed by the intelligent controlled HVAC vent that has no externally set temperature goal to the second information;
ascertaining whether at least one other intelligent controlled HVAC vent that has no externally set temperature goal is fully open;
if (a) a result of the first comparing indicates the temperature of the location fed by the intelligent controlled HVAC vent that has no externally set temperature goal is outside the dead band and (b) a result of the second comparing indicates the temperature of the location fed by the intelligent controlled HVAC vent that has no externally set temperature goal is less than temperatures of all locations fed by other intelligent controlled HVAC vents that have no externally set temperature goals and (c) at least one other intelligent controlled HVAC vent that has no externally set temperature goal is ascertained to be fully open, decreasing the extent to which the intelligent controlled HVAC vent that has no externally set temperature goal is open.

19. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
ascertaining whether at least one intelligent controlled HVAC vent that has an externally set temperature goal is fully open and has failed to achieve the externally set temperature goal; and
if (a) a result of the first comparing indicates the temperature of the location fed by the intelligent controlled HVAC vent that has no externally set temperature goal is within the dead band and (b) at least one intelligent controlled HVAC vent that has an externally set temperature goal is ascertained: (1) to be fully open and (2) to have failed to achieve the externally set temperature goal, decreasing the extent to which the intelligent controlled HVAC vent that has no externally set temperature goal is open.

20. The method according to claim 1, further comprising:
ascertaining a dead band of all other locations fed by respective intelligent controlled HVAC vents that have no externally set temperature goals;
first comparing the temperature of the location fed by the intelligent controlled HVAC vent that has no externally set temperature goal to the dead band;
ascertaining whether at least one intelligent controlled HVAC vent is fully open;
if (a) a result of the first comparing indicates the temperature of the location fed by the intelligent controlled HVAC vent that has no externally set temperature goal is within the dead band and (b) no intelligent controlled HVAC vent is ascertained to be fully open, increasing the extent to which the intelligent controlled HVAC vent that has no externally set temperature goal is open.

* * * * *

UNITED STATES PATENT AND TRADEMARK OFFICE
CERTIFICATE OF CORRECTION

| | | |
|---|---|---|
| PATENT NO. | : 10,281,937 B2 | Page 1 of 1 |
| APPLICATION NO. | : 15/155330 | |
| DATED | : May 7, 2019 | |
| INVENTOR(S) | : Jon Barrett et al. | |

It is certified that error appears in the above-identified patent and that said Letters Patent is hereby corrected as shown below:

In the Claims

In Column 39, Line 63:
Replace "a"
With --that--

In Column 43, Lines 4-5:
Replace "HVAC that as no externally set temperature goal vent"
With --HVAC vent that has no externally set temperature goal--

Signed and Sealed this
Sixteenth Day of July, 2019

Andrei Iancu
*Director of the United States Patent and Trademark Office*